United States Patent
Ostrowski et al.

(10) Patent No.: US 11,433,742 B2
(45) Date of Patent: Sep. 6, 2022

(54) AUTOMATIC CONTROL OF A HEATING ELEMENT IN THERMAL COMMUNICATION WITH A REAR WINDOW OF A VEHICLE PURSUANT TO PREDICTIVE MODELING THAT RECALIBRATES BASED ON OCCUPANT MANUAL CONTROL OF THE HEATING ELEMENT

(71) Applicant: Ford Global Technologies, LLC, Dearborn, MI (US)

(72) Inventors: David Ostrowski, Northville, MI (US); Elizabeth Anne Manwell, Canton, MI (US); William G. Herbert, Bloomfield Hills, MI (US); Victoria Leigh Schein, Dearborn, MI (US); Mohan John, Dearborn, MI (US); Lawrence C. Karas, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 686 days.

(21) Appl. No.: 16/437,573

(22) Filed: Jun. 11, 2019

(65) Prior Publication Data

US 2020/0391576 A1    Dec. 17, 2020

(51) Int. Cl.
*B60J 1/02*       (2006.01)
*B60J 1/00*       (2006.01)
(Continued)

(52) U.S. Cl.
CPC ............. *B60J 1/002* (2013.01); *B60W 10/30* (2013.01); *B60S 1/0818* (2013.01); *B60W 40/02* (2013.01); *B60W 50/0098* (2013.01); *H05B 3/86* (2013.01)

(58) Field of Classification Search
None
See application file for complete search history.

(56) References Cited

U.S. PATENT DOCUMENTS 5,187,943  A    2/1993  Taniguchi et al.
6,237,675  B1   5/2001  Oehring et al.
(Continued)

FOREIGN PATENT DOCUMENTS

WO    2016070052 A1    5/2016

OTHER PUBLICATIONS

RuleQuest Research Data Mining Tools, Release 2.07 GPL Edition (C.50 Program); http://www.rulequest.com/ (accessed Dec. 8, 2017, 1 page).

(Continued)

*Primary Examiner* — Jonathan M Dager
(74) *Attorney, Agent, or Firm* — Vichit Chea; Price Heneveld LLP

(57) ABSTRACT

A method of controlling a heating element in thermal communication with a rear window of a vehicle comprises: with a vehicle being in an external environment and comprising a rear window and a heating element in thermal communication with the rear window, a controller in communication with the heating element, the controller including a Pre-established Predictive Activation Model setting forth rules governing activation of the heating element as a function of data relating to Certain Identifiable Conditions, and a user interface configured to allow the heating element to be manually activated or deactivated; collecting data relating to the Certain Identifiable Conditions; determining, by comparing the collected data to the rules of the Pre-established Predictive Activation Model, whether the collected data satisfies the rules of the Pre-established Predictive Activation Model so as to initially automatically activate the heating element; and automatically activating the heating element.

20 Claims, 15 Drawing Sheets

(51) Int. Cl.
*B60W 10/30* (2006.01)
*B60W 50/00* (2006.01)
*B60W 40/02* (2006.01)
*B60S 1/08* (2006.01)
*H05B 3/86* (2006.01)

(56) References Cited

U.S. PATENT DOCUMENTS

| | | |
|---|---|---|
| 6,454,178 B1 | 9/2002 | Fusco et al. |
| 6,508,408 B2 * | 1/2003 | Kelly ................. B60H 1/00785 236/44 C |
| 6,698,663 B2 | 3/2004 | Wang et al. |
| 6,917,019 B2 * | 7/2005 | Richter .................... H05B 3/84 219/202 |
| 8,082,979 B2 | 12/2011 | Greiner et al. |
| 8,096,482 B2 * | 1/2012 | Dage ................. B60H 1/00828 236/51 |
| 8,800,644 B2 | 8/2014 | Greiner et al. |
| 9,159,232 B2 | 10/2015 | Ricci |
| 9,524,514 B2 | 12/2016 | MacNeille et al. |
| 9,555,689 B2 | 1/2017 | Sebastian et al. |
| 9,688,281 B2 | 6/2017 | Parundekar |
| 9,724,980 B2 * | 8/2017 | Hoke .................... H05B 1/0236 |
| 9,878,592 B2 * | 1/2018 | Kim .................. B60H 1/00814 |
| 10,293,657 B2 * | 5/2019 | Ochiai ............... B60H 1/00849 |
| 11,292,314 B2 * | 4/2022 | Lee ................... B60H 1/00742 |
| 2003/0039298 A1 | 2/2003 | Eriksson et al. |
| 2003/0106883 A1 * | 6/2003 | Sangwan ................. H05B 3/84 219/203 |
| 2008/0223049 A1 * | 9/2008 | Every ....................... F25C 5/08 62/154 |
| 2009/0025412 A1 * | 1/2009 | Takehisa .................. B60J 1/002 62/244 |
| 2012/0047929 A1 * | 3/2012 | Delorme ................. B60S 1/026 62/155 |
| 2012/0312520 A1 | 12/2012 | Hoke et al. |
| 2014/0100716 A1 * | 4/2014 | Kawai ..................... B60L 53/14 701/2 |
| 2014/0217080 A1 * | 8/2014 | Hoke ........................ B60L 1/02 219/203 |
| 2014/0330453 A1 * | 11/2014 | Nakagawa ............ B60L 53/305 701/2 |
| 2015/0197136 A1 | 7/2015 | Chen et al. |
| 2015/0210265 A1 * | 7/2015 | Rademacher ......... B60W 10/30 701/112 |
| 2016/0200166 A1 * | 7/2016 | Stanek .................... F02N 11/12 454/75 |
| 2016/0223218 A1 * | 8/2016 | Barrett ..................... F24F 11/30 |
| 2016/0371641 A1 | 12/2016 | Wilson et al. |
| 2017/0036511 A1 * | 2/2017 | Lee .................... B60H 1/00771 |
| 2017/0043665 A1 * | 2/2017 | Khafagy .................. B60L 1/02 |
| 2017/0052538 A1 | 2/2017 | Li et al. |
| 2017/0158023 A1 | 6/2017 | Stevanovic et al. |
| 2017/0282685 A1 | 10/2017 | Bader et al. |
| 2018/0086178 A1 * | 3/2018 | Stanek ............... B60H 1/00657 |
| 2019/0143787 A1 * | 5/2019 | Gutowski .......... B60H 1/00785 165/202 |
| 2019/0156134 A1 * | 5/2019 | Krishnan ............... G06V 20/59 |
| 2019/0176568 A1 * | 6/2019 | Ostrowski ................ B60N 2/56 |
| 2019/0256125 A1 * | 8/2019 | Ostrowski ................ B62D 1/06 |
| 2019/0359175 A1 * | 11/2019 | Wang ...................... B60S 1/023 |
| 2020/0148037 A1 * | 5/2020 | Litz ......................... B60S 1/544 |
| 2020/0156593 A1 * | 5/2020 | Boss ..................... B60S 1/3463 |
| 2020/0223398 A1 * | 7/2020 | Hoshino ................. B60S 1/026 |
| 2021/0339604 A1 * | 11/2021 | Gutowski .......... B60H 1/00785 |

OTHER PUBLICATIONS

Mark Hall, M5PBase. Implements Base Routines for Generating M5 Model Trees and Rules, Weka; http://weka.sourceforge.net/doc.stable/weka/classifiers/trees/M5P.html (accessed Dec. 8, 2017, 7 pages).

Frank et al., Class Random Tree, Class for Constructing a Tree That Considers K Randomly Chosen Attributes at Each Node. Performs No Pruning. Also Has an Option to Allow Estimation of Class Probabilities (or Target Mean in the Regression Case) Based on a Hold-Out Set (Backfitting), Weka; http://weka.sourceforge.net/doc.dev/weka/classifiers/trees/RandomTree.html (accessed Dec. 8, 2017, 15 pages).

Malcolm Ware, Class MultilayerPerceptron, A classified that uses backpropagation to classify instances. This network can be built by hand, created by an algorithm or both. The network can also be monitored and modified during training time. The nodes in this network are all sigmoid (except for when the class is numeric in which case the the output nodes become unthresholded linear units)., Weka; http://weka.sourceforge.net/doc.stable/weka/classifiers/functions/MultilayerPerceptron.html (accessed Dec. 8, 2017, 19 pages).

* cited by examiner

AUTOMATIC CONTROL OF A HEATING ELEMENT IN THERMAL COMMUNICATION WITH A REAR WINDOW OF A VEHICLE PURSUANT TO PREDICTIVE MODELING THAT RECALIBRATES BASED ON OCCUPANT MANUAL CONTROL OF THE HEATING ELEMENT

FIELD OF THE INVENTION

The present invention generally relates to activation and deactivation of a heating element in thermal communication with a rear window of a vehicle in order to defrost the rear window.

BACKGROUND OF THE INVENTION

A vehicle typically includes a rear windshield through which an operator and passengers, if any, can view an environment rearward of the vehicle. The vehicle sometimes includes a heating element in thermal communication with the rear windshield. The heating element is sometimes utilized to remove ice, snow, or other condensation on the rear windshield that can obscure view through the rear windshield. The operator typically has to manually actuate the heating element via a button that may be visually similar to other buttons.

SUMMARY OF THE INVENTION

The present disclosure solves those problems by automatically controlling (activating and deactivating) the heating element according to the rules of a pre-established predictive activation model that considers input data from a multitude of sources, and recalibrates after the operator overrules automatic controlling thereof. The automatic control according to the rules of the pre-established predictive model eliminates the need for a physical button, and reduces and eventually potentially eliminates the need for the operator to manually control the heating element to defrost the rear windshield.

According to one aspect of the present invention, a method of controlling a heating element in thermal communication with a rear window of a vehicle comprises: the vehicle being in an external environment and comprising: a rear window and a heating element in thermal communication with the rear window; a controller in communication with the heating element, the controller including a Pre-established Predictive Activation Model setting forth rules governing activation of the heating element as a function of data relating to Certain Identifiable Conditions; and a user interface configured to allow the heating element to be manually activated or deactivated; collecting data relating to the Certain Identifiable Conditions; determining, by comparing the collected data to the rules of the Pre-established Predictive Activation Model, whether the collected data satisfies the rules of the Pre-established Predictive Activation Model so as to initially automatically activate the heating element; and automatically activating the heating element.

Embodiments of the one aspect of the invention can include any one or a combination of the following features:
- the Pre-established Predictive Activation Model was formed pursuant to a classification and regression tree analysis of input data related to the Certain Identifiable Conditions collected from other operators of other vehicles;
- the Pre-established Predictive Activation Model establishes rules that are a function of at least the following Certain Identifiable Conditions: the time of day; and the temperature within an interior of the vehicle;
- the Pre-established Predictive Activation Model establishes rules that are further a function of at least the following Certain Identifiable Condition: whether there is sufficient moisture on a front windshield of the vehicle so as to cause activation of automatically activated wipers to wipe the front windshield;
- the Pre-established Predictive Activation Model establishes rules that are further a function of at least the following Certain Identifiable Conditions: the temperature of the external environment; and positioning of an accelerator pedal of the vehicle relative to fully depressed or not depressed;
- when the time of the day is a morning time, the controller activates the heating element pursuant to the rules of the Pre-established Predictive Activation Model as a function of data related to at least one other of the Certain Identifiable Conditions excluding the time of the day;
- when the temperature within an interior of the vehicle is above a certain temperature, the controller does not activate the heating element pursuant to the rules of the Pre-established Predictive Activation model, but when the temperature within the interior of the vehicle is below the certain temperature, an air conditioning function has been activated, it is not a morning time, and the accelerator pedal is depressed greater than a certain percentage, then the controller activates the heating element pursuant to the rules of the Pre-established Predictive Activation model;
- when the time of day is not a morning time, the controller does not activate the heating element pursuant to the rules of the Pre-established Predictive Activation Model, but when the time of day is a morning time, the controller activates the heating element pursuant to the rules of the Pre-established Predictive Activation Model as a function of at least: (i) the temperature of the external environment; (ii) whether there is sufficient moisture on a front windshield of the vehicle so as to cause activation of automatically activated wipers to wipe the front windshield; and (iii) the difference in temperature between the temperature within an interior of the vehicle and the temperature of the external environment;
- when there is sufficient moisture on a front windshield of the vehicle so as to cause activation of automatically activated wipers to wipe the front windshield, the controller activates the heating element pursuant to the rules of the Pre-established Predictive Activation Model if: (i) the temperature of an external environment is greater than 60° Fahrenheit; or (ii) the difference in temperature between the temperature within an interior of the vehicle and the temperature of the external environment is greater than 10° Fahrenheit;
- when there is insufficient moisture on a front windshield of the vehicle to cause activation of automatically activated wipers to wipe the front windshield, the controller activates the heating element pursuant to the rules of the Pre-established Predictive Activation Model if: (i) an air recirculation setting is activated; (ii) the temperature of the external environment is less than a first certain temperature; (iii) an air conditioning setting is activated, (iv) the accelerator pedal is depressed at least a certain percentage; and (v) the temperature of the external environment is greater than a second certain temperature that is less than the first certain temperature;

pursuant to the rules of the Pre-established Predictive Activation Model, the controller activates the heating element if the temperature in an interior of the vehicle is below a certain temperature and one or more of the other Certain Identifiable Conditions are satisfied, but if the controller determines that the temperature in the interior of the vehicle rises above the certain temperature, then the controller deactivates the heating element;

pursuant to the rules of the Pre-established Predictive Activation Model, the controller activates the heating element if the time of day is within a certain period of time and one or more of the other Certain Identifiable Conditions are satisfied, but if the controller determines that the time of day is no longer within the certain period of time, then the controller deactivates the heating element;

pursuant to the rules of the Pre-established Predictive Activation Model, the controller activates the heating element if: (i) a blower of the vehicle is blowing heated air into an interior of the vehicle with high blower speed; (ii) the difference in temperature between the temperature within the interior of the vehicle and the temperature of the external environment is within a certain range; and (iii) the speed of an engine of the vehicle is above a certain value, but the controller deactivates the heating element if the controller determines that the difference in temperature between the temperature within the interior of the vehicle and the temperature of the external environment exceeds the certain range;

pursuant to the rules of the Pre-established Predictive Activation Model, the controller activates the heating element if the speed of the engine is above a certain value and other of the Certain Identifiable Conditions are satisfied, but the controller deactivates the heating element if the speed of the engine falls below the certain value although the other of the Certain Identifiable Conditions are still satisfied;

automatically deactivating the heating element pursuant to the Pre-established Predictive Activation Model, after initially automatically activating the heating element pursuant to the Pre-established Predictive Activation Model, if the collected data relating to the Certain Identifiable Conditions collected after initially automatically activating the heating element satisfy the rules of the Pre-established Predictive Activation Model for deactivation of the heating element;

automatically reactivating the heating element pursuant to the Pre-established Predictive Activation Model, after automatically deactivating the heating element pursuant to the Pre-established Predictive Activation Model, if the collected data relating to the Certain Identifiable Conditions collected after deactivating the heating element again satisfy the rules for activation pursuant to the Pre-established Predictive Activation Model;

an occupant of the vehicle manually deactivating the heating element via the user interface;

upon the occupant manually deactivating the heating element via the user interface, recalibrating the Pre-established Predictive Activation Model into a new predictive activation model accounting for the collected data relating to the Certain Identifiable Conditions existing when the occupant manually deactivated the heating element and establishing new rules for activation and/or deactivation of the heating element;

the occupant manually activating the heating element via the user interface; and upon the occupant manually activating the heating element via the user interface, recalibrating the new predictive activation model into a newer predictive activation model accounting for the collected data relative to the Certain Identifiable Conditions existing when the occupant manually activated the heating element and establishing new rules for activation and/or deactivation of the heating element.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
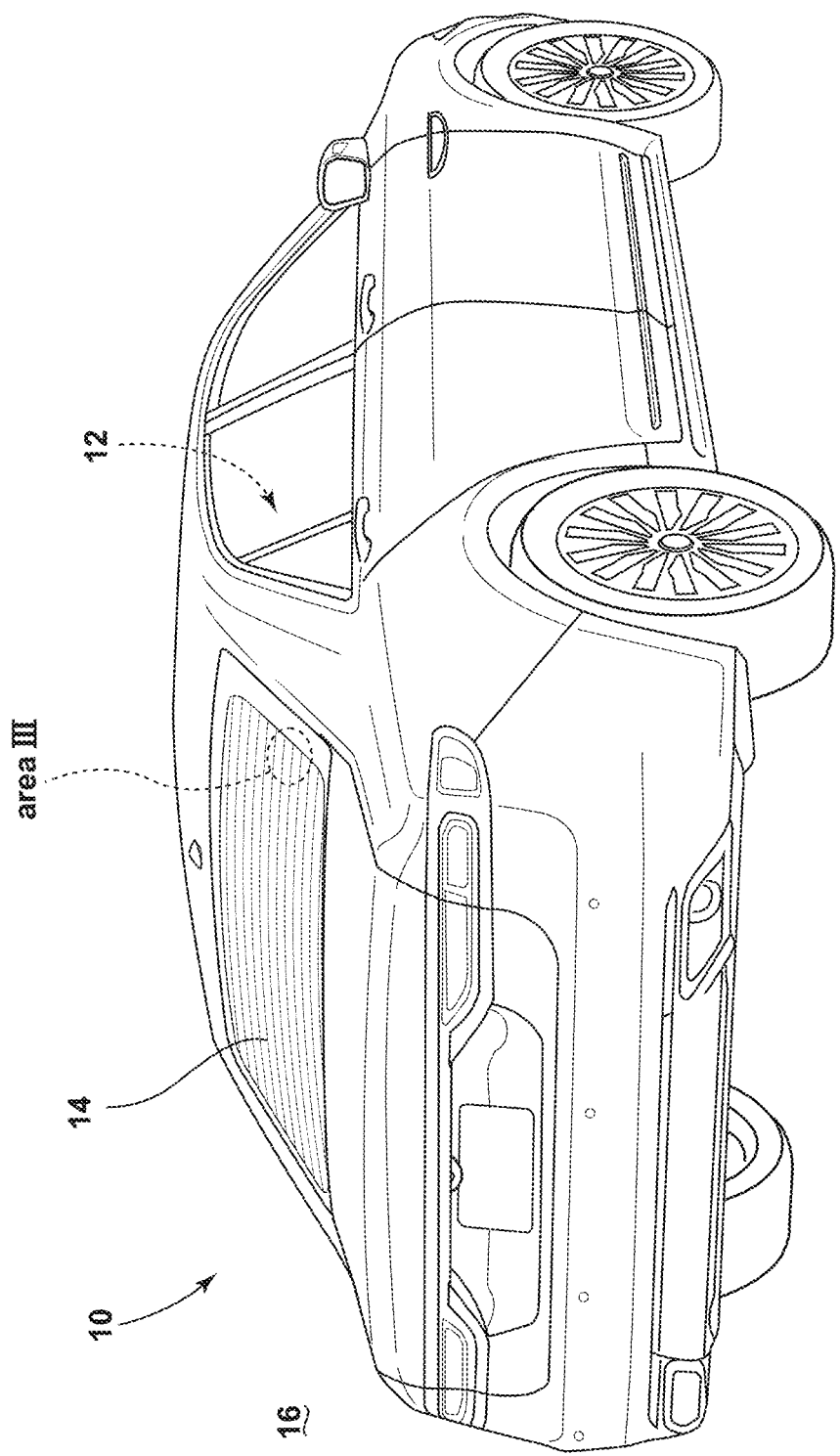
FIG. 1 is a rear perspective view of a vehicle surrounded by an external environment, illustrating a rear windshield that separates an interior of the vehicle from the external environment.
Figure 2:
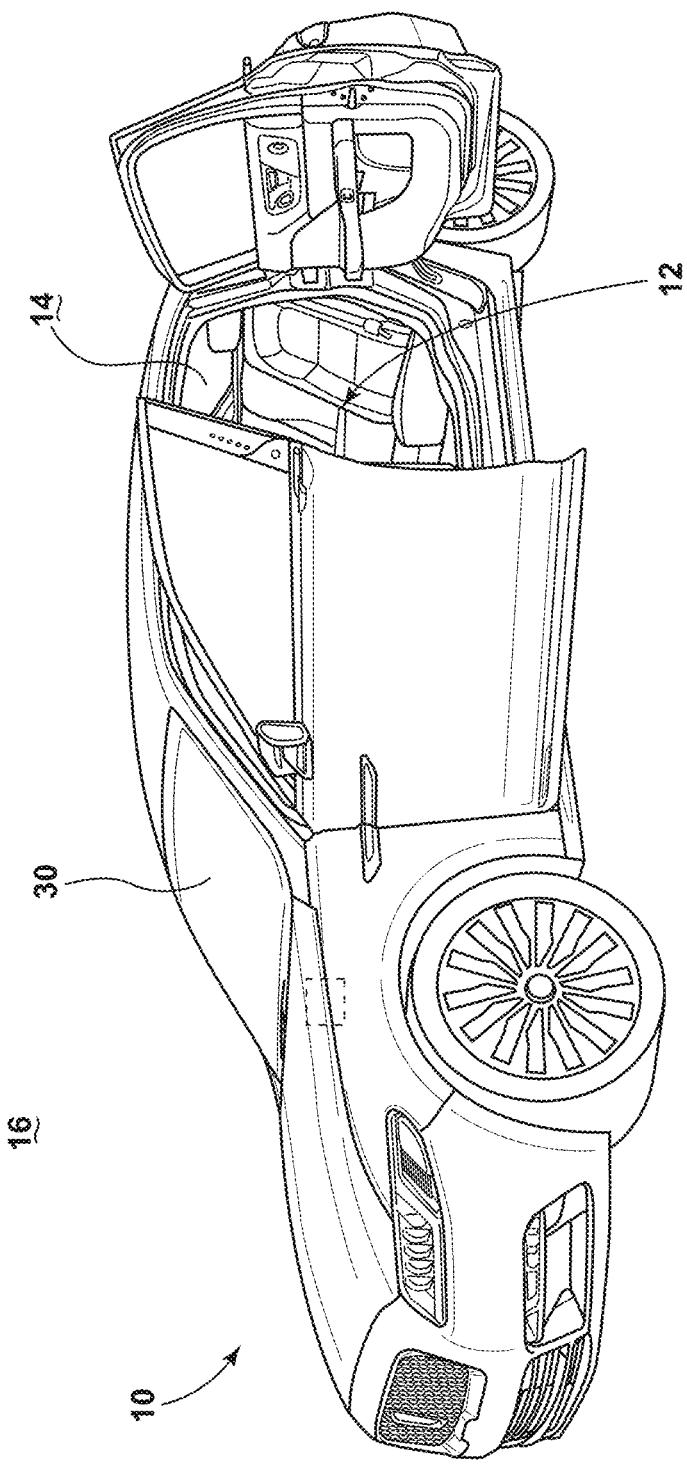
FIG. 2 is a front perspective view of the vehicle of FIG. 1, illustrating that the vehicle further includes a controller.
Figure 3:
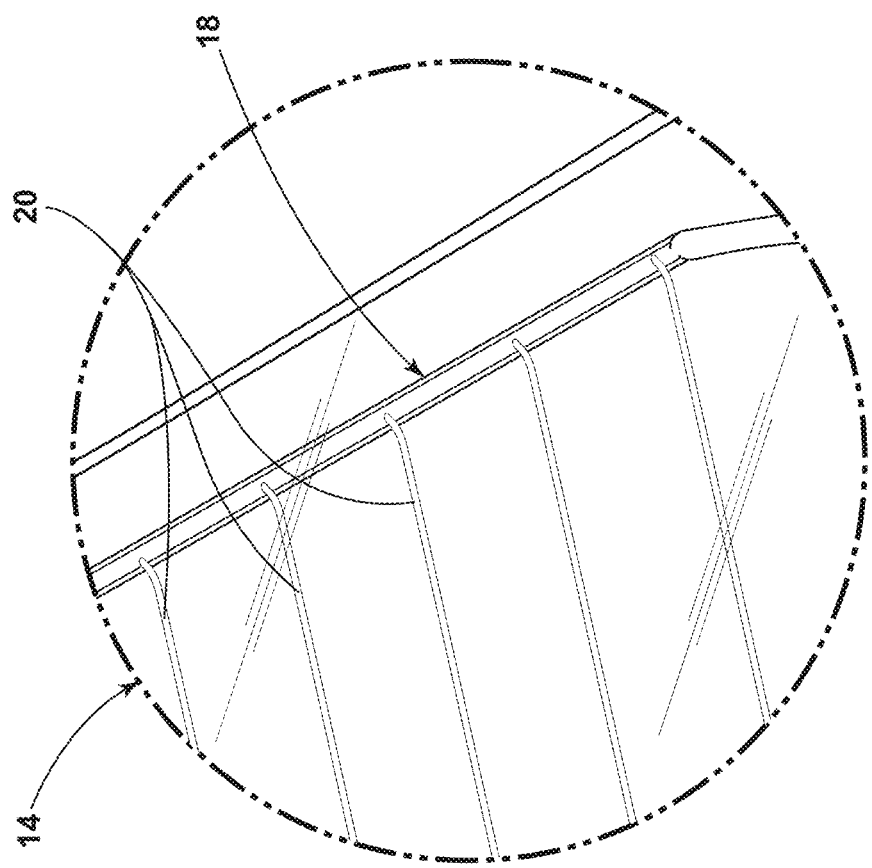
FIG. 3 is a magnified view of area III of FIG. 1, illustrating the rear windshield of FIG. 1 including a heating element with electrically conductive strips that resist the flow of electricity and thereby generate heat that transfers to the rear windshield to "defrost" the rear windshield.

Referring to FIGS. 1-3, a vehicle 10 includes an interior 12 and a rear windshield 14 separating the interior 12 from an external environment 16. The vehicle 10 further includes a heating element 18 that is in thermal communication with the rear windshield 14. In the illustrated embodiment, the heating element 18 includes numerous electrically conductive strips 20 that extend along the rear windshield 14. When the heating element 18 activated, the electrically conductive strips 20 are supplied with a current, the electrically conductive strips 20 offer resistance to the current, and the resistance generates heat. The generated heat transfers to the rear windshield 14 and thus warms ice, snow, and condensation that is on the rear windshield 14 causing the same to melt or evaporate. In other embodiments, the heating element 18 heats air that is directed onto the rear windshield 14. The heating element 18 is sometimes referred to by the result of activation of the heating element 18—i.e., as "rear defrost" and similar terms.

Figure 4:
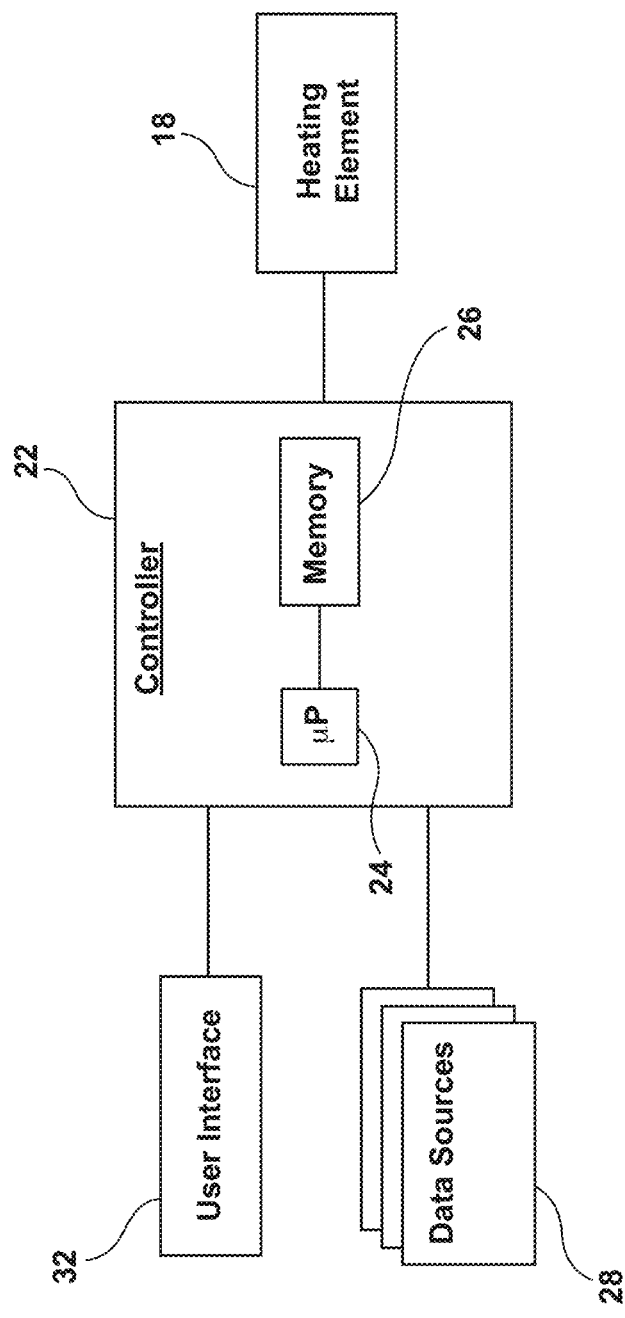
FIG. 4 is a schematic diagram including the controller of FIG. 2, illustrating that the controller controls the heating element as a function of both a user interface of the vehicle and data received from a variety of data sources.

Referring now to FIG. 4, the vehicle 10 further includes a controller 22. The controller 22 is in communication with the heating element 18. The controller 22 controls whether the heating element 18 is activated to impart heat to the rear windshield 14 or deactivated. The controller 22 can include a microprocessor 24 to execute programs, such as those used to control the heating element 18, stored in a memory 26.

The controller 22 includes a Pre-established Predictive Activation Model setting forth rules that govern whether the controller 22 will initially automatically activate the heating element 18 to impart heat to the rear windshield 14 without the input or instruction of the operator or other occupant of the vehicle 10. The Pre-established Predictive Activation Model(s) can be stored in the memory 26. The Pre-established Predictive Activation Model is initially generated as a consequence of analyzing data collected from users of other vehicles (hereinafter, "Test Vehicles") and the conditions existing when those other users manually activated or deactivated the heating element 18 to heat the rear windshield 14 of those vehicles. The general analysis concerns the question of what conditions existed when the users of the Test Vehicles activated the heating element 18 to impart heat to the rear windshield 14. The identification of those conditions, along with monitoring of present conditions experienced by the vehicle 10, can be utilized to predict when an operator of the vehicle 10 would desire to have the heating element 18 activated to impart heat to the rear windshield 14 and then automatically activate the heating element 18 to do so without the user manually instructing the controller 22 to activate the heating element 18. In other words, the Pre-established Predictive Activation Model is formed pursuant to an analysis of input data collected from the Test Vehicles relating to numerous conditions (hereinafter, "Certain Identifiable Conditions"). The Pre-established Predictive Activation Model is both generated and applied as a function of those Certain Identifiable Conditions. The Pre-established Predictive Activation Model and the Certain Identifiable Conditions are discussed in greater detail below.

The controller 22 receives input from one or more data sources 28 within the vehicle 10 concerning the Certain Identifiable Conditions. The one or more data sources 28 can be sensors and/or settings, among other things. For example, one data source 28 could be a temperature sensor that provides the temperature of the external environment 16 (i.e., ambient temperature) to the controller 22. Another data source 28 could be a moisture sensor in association with a front windshield 30 (see FIG. 2) of the vehicle 10, which detects the presence of rain or other moisture on the front windshield 30, such as for purposes of activating/deactivating an automatic wiper for the front windshield 30. Another data source 28 could be a clock providing time data to the controller 22. The data source 28 can be external to the vehicle 10, such as location data via a global positioning system (GPS). As discussed further below, the controller 22 utilizes data concerning the Certain Identifiable Conditions to control the heating element 18 according to the Pre-established Predictive Activation Model and subsequent refinements thereof caused by operator manual override/control of the heating element 18, as discussed below.

Figure 5:
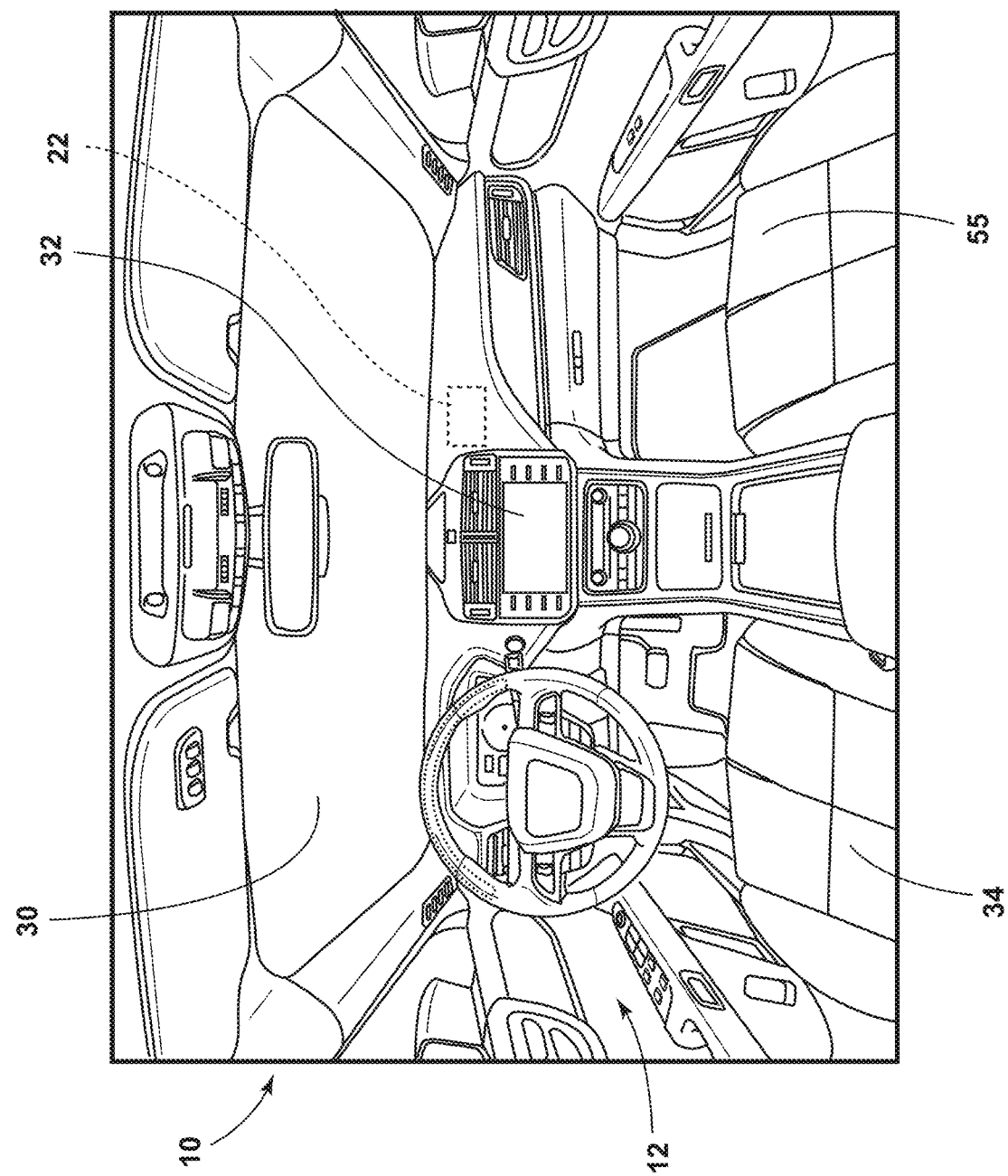
FIG. 5 is a view looking forward in the interior of the vehicle of FIG. 1, illustrating the user interface mentioned in connection with FIG. 4 and several seating assemblies.
Figure 6A:
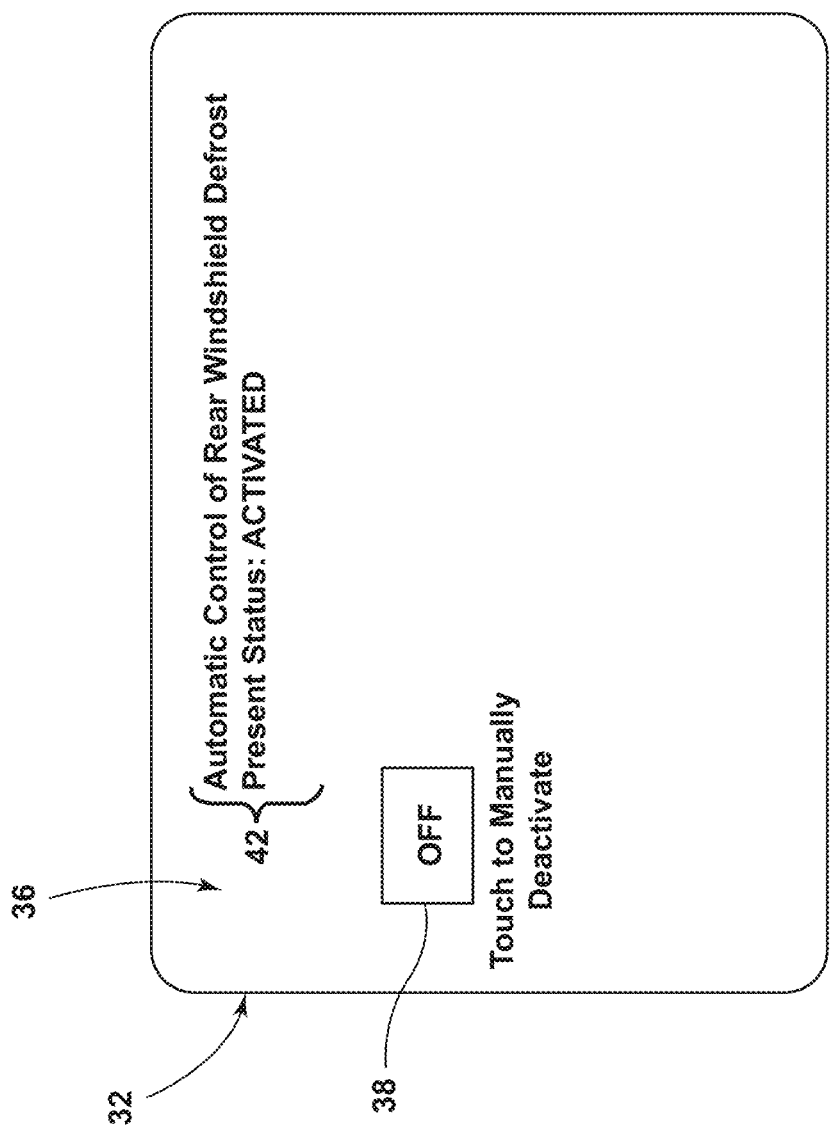
FIG. 6A is an example illustration of the user interface of FIGS. 4 and 5 notifying the operator of the vehicle that the controller has automatically activated the heating element to the rear windshield and providing a graphical button allowing the operator to manually deactivate the heating element and thereby override the automatic control thereof.
Figure 6B:
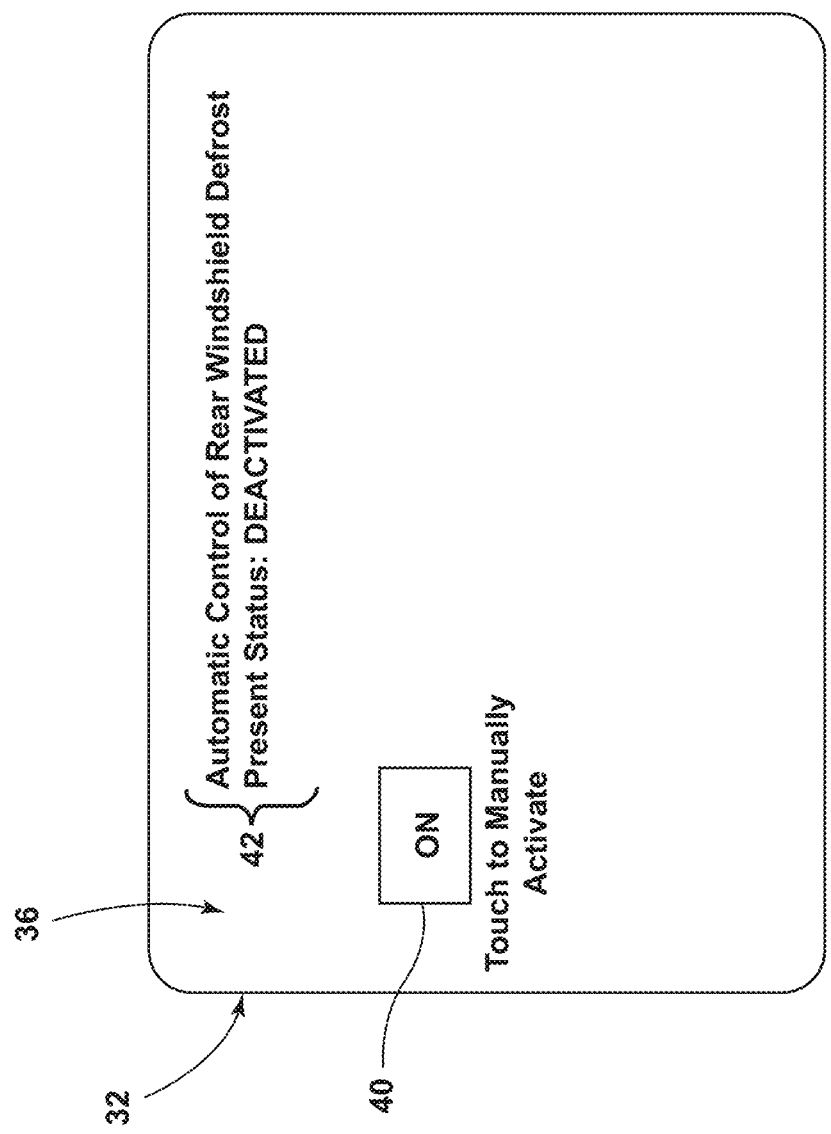
FIG. 6B is an example illustration of the user interface notifying the operator of the vehicle that the controller has automatically deactivated the heating element to the rear windshield and providing a graphical button allowing the operator to manually activate the heating element and thereby override the automatic control thereof.

Referring now to FIGS. 5, 6A, and 6B, the vehicle 10 further includes a user interface 32 in communication with the controller 22. The user interface 32 can be located in the interior 12 of the vehicle 10 such that an operator occupant of a seating assembly 34 can interact with the user interface 32. For example, the user interface 32 can be a touch screen display 36 and/or a voice-manipulable user interface, among other things. The user interface 32 is configured to allow the operator occupant to manually activate the heating element 18 if the controller 22 has not activated the heating element 18 to impart heating to the rear windshield 14 as the user desires. In addition, the user interface 32 is configured to manually deactivate the heating element 18 if the controller 22 has activated the heating element 18 to impart heating to the rear windshield 14 contrary to the desires of the operator occupant. For example, the user interface 32 could be the touch screen display 36 with an option (e.g., a graphical button 38 labeled "OFF"), allowing the operator occupant of the seating assembly 34 or some other occupant of the vehicle 10 to deactivate the heating element 18 of the rear windshield 14 that the controller 22 has automatically activated according to the Pre-established Predictive Activation Model to impart heat. If the operator occupant presses the "OFF" button 38, the controller 22 accepts the interaction as input and deactivates the heating element 18 from imparting heat to the rear windshield 14. Similarly, the touch screen display 36 can include an option (e.g., a graphical button 40 labeled "ON"), allowing the operator occupant to activate the heating element 18 of the rear windshield 14 that the controller 22 has not automatically activated following the rules of the Pre-established Predictive Activation Model (or subsequently revised iterations thereof, as discussed below). If the user presses the button 40 labeled "ON," the controller 22 accepts the interaction as input and activates the heating element 18 to impart heat to the rear windshield 14. For example, if the operator occupant desires the heating element 18 to impart heat to the rear windshield 14, but the controller 22 has not automatically caused the heating element 18 to do so pursuant to the Pre-established Predictive Activation Model, then the operator occupant navigates to the touch screen display 36 to the proper option screen and presses the button 40 labeled "ON," and the controller 22 then activates the heating element 18 to impart heat to the rear windshield 14. The controller 22 can cause the touch screen display 36 to provide a notification 42 to the operator occupant as to the present status of the automatically controlled heating element 18 of the rear windshield 14. For example, as illustrated in FIG. 6B, the "ON" button 40 can be presented to the user when the notification 42 notifies the operator occupant that the heating element 18 is presently automatically deactivated (not activated). Similarly, as illustrated in FIG. 6A, the "OFF" button 38 can be presented to the operator occupant as a touchable option when the notification 42 notifies the operator occupant that the heating element 18 is presently automatically activated. The operator occupant's interaction with the user interface 32 in this manner to override the controller's 22 automatic control of the heating element 18 affects the controller's 22 subsequent automatic control thereof, as discussed in greater detail below.

Figure 7:
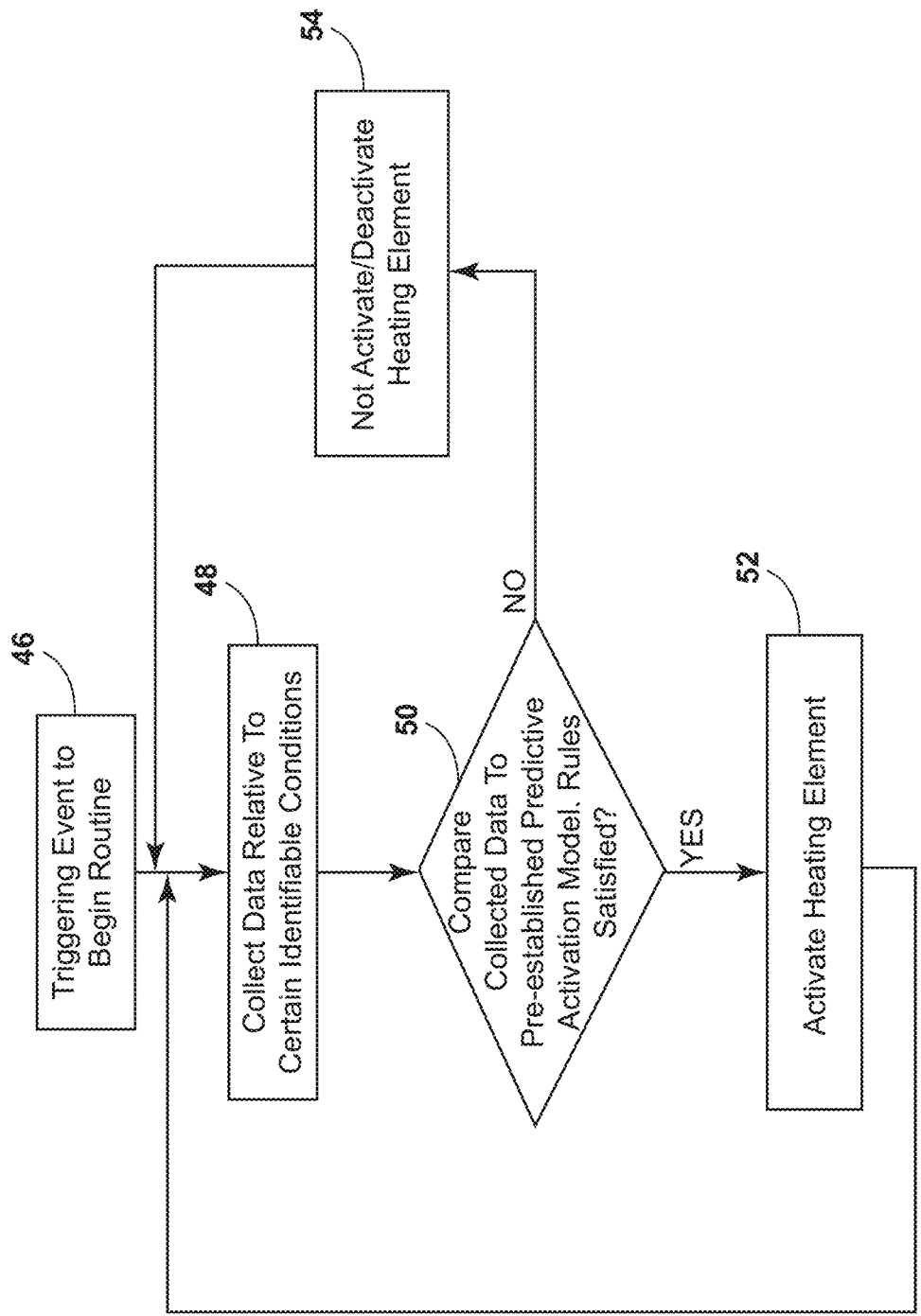
FIG. 7 is a flow diagram of a method of controlling the heating element of the rear windshield of FIG. 1, illustrating the steps of collecting data from the data sources mentioned in FIG. 4, comparing the collected data to the rules of a pre-established predictive activation model utilized by the controller, and either activating or not activating/deactivating the heating element as a function of the collected data applied to the rules of the pre-established predictive activation model.

Referring now to FIG. 7, the above vehicle 10, including the rear windshield 14 with the heating element 18 in thermal communication with the rear windshield 14, the controller 22, and the user interface 32, can be utilized in performing a novel method of controlling the heating element 18. The novel method (at step 46) can include a triggering event that causes the controller 22 to begin the rest of the method (e.g., to begin the routine). The triggering event can be the powering on of the vehicle 10 (e.g., engine ignition), a preset time of the day (e.g., five minutes before the operator occupant typically begins a morning commute), or the vehicle 10 detecting the presence of the operator occupant occupying the seating assembly 34 (such as through capacitive or weight sensors), among other such potential triggering events. The novel method (at step 48) includes collecting data relating to the Certain Identifiable Conditions (from the data sources 28), (at step 50) determining (by comparing the collected data to the rules of the Pre-established Predictive Activation Model governing activation) whether the collected data satisfies the rules of the Pre-established Predictive Activation Model so as to initially automatically activate the heating element 18, and, if so, (at step 52) initially automatically activate the heating element 18. If comparing the collected data to the Pre-established Predictive Activation Model reveals that the rules for activation of the heating element 18 are not satisfied, then (at step 54) the heating element 18 is not activated (or deactivated if already automatically activated) and the method can proceed back to step 48 and the data collection continues. Stated another way, even if the collected data satisfies the rules of the Pre-established Predictive Activation Model for activation of the heating element 18 at one point in time, the method can further include proceeding back to step 48 to continue data collection and subsequently to determine whether the collected data satisfies the rules of the Pre-established Predictive Activation Model for deactivation of the heating element 18, resulting in deactivation of the heating element 18 at step 54. This loop is continuous, and the controller 22 constantly collects data to determine whether the heating element 18 is to be activated or not activated/deactivated according to the rules of the Pre-established Predictive Activation Model.

We now further discuss the Test Vehicles and the data collected therefrom relating to the Certain Identifiable Conditions. The Pre-established Predictive Activation Model is generated from the data related to the Certain Identifiable Conditions acquired from the Test Vehicles and used for subsequent recalibrations or iterations thereof. Data was collected from a number of Test Vehicles with a heating element 18 to impart heat to a rear windshield 14.

The data was narrowed down to data related to a number of conditions forming the Certain Identifiable Conditions, which were thought to have some relation to the decision of an operator occupant as to when to activate (and deactivate) the heating element 18 in thermal communication with the rear windshield 14 to "defrost" the same. Those Certain Identifiable Conditions include (a) whether a heated steering wheel function is activated ("CC_HtdStrWhl_Req"; "CC_HtdStrWhl_Req_Binary"; "heatedSteeringWheel") (the data identifiers within the parenthesis refer to the associated data identifiers that may appear in the example Pre-Established Predictive Activation Models below); (b) whether an air conditioning function has been activated ("AC_Request"); (c) the set point temperature for air directed toward the seating assembly 34 for the operator occupant ("Front_Left_Temp_Setpt"); (d) whether an air recirculation setting is activated ("Recirc_Request"); (e) the level at the air blower is blowing air into the interior 12 ("Front_Rear_Blower_Req"); (f) the speed of the vehicle 10 ("Veh_V_ActlEng" "vehicle_speed"; "Veh_V_ActlEng_UB"); (g) the temperature of the external environment 16, that is the ambient temperature ("AirAmb_Te_Act"; "AirAmb_Te_Actl UB"; "AirAmb_Te_ActlFilt"; "AirAmb_ Te_ActlFilt UB"); (h) the temperature within the interior 12 of the vehicle 10 ("InCarTemp"; "InCarTempQF"); (i) the difference in temperature between the temperature within the interior 12 of the vehicle 10 and the temperature of the external environment 16 ("tempDiff"="InCarTemp"–"AirAmb_Te_Act"); (j) direct or indirect moisture sensor readings, such as whether there is sufficient moisture on the front windshield 30 so as to cause activation of automatically activated wipers to wipe the front windshield 30 ("Smart_Wiper_Motor_Stat"; "Smart_Wiper_Motor_Stat_UB"); (k) positioning of the accelerator pedal relative to fully depressed or not depressed, such as percentage depressed ("accelerator_pedal_position"); (l) the speed of the engine ("EngAout_N_Act1"; "EngAout_N_Actl_UB"); and (m) time and date derived conditions, such as the time of day, day of week, month of year, season of the year (examples include whether it is a morning time of day ("isMorning"), whether the season is the summer season ("isSummer"), or whether the season is the winter season. Note that some of the data might be derived from operator action, such as positioning of the accelerator pedal or whether an air conditioning function has been activated. However, as vehicles become more autonomous, the air conditioning function might have been activated automatically without operator interaction. Note that some of the data might be entirely passive, such as the time data. Pre-established Predictive Activation Model can utilize both passive data and data related to active operator interaction.

That data related to some of the Certain Identifiable Conditions can be manipulated to make the data more meaningfully predictive for the Pre-established Predictive Activation Model. In this regard, some of the Certain Identifiable Conditions can be derived from other Certain Identifiable Conditions and further analyzed for predictive power for the Pre-established Predictive Activation Model. For example, as mentioned above, the Certain Identifiable Conditions of the temperature within the interior 12 of the vehicle 10 ("InCarTemp") and the temperature of the external environment 16, that is the ambient temperature ("AirAmb_Te_Act"; "AirAmb_Te_ActlFilt"), can be used to calculate the Certain Identifiable Condition of the temperature differential ("tempDiff") between those two temperatures. Likewise, as mentioned above, whether it is a morning time of day ("isMorning"), and whether the season is the summer season ("isSummer") were derived from time data.

As another example, one or more Certain Identifiable Conditions can be calculated to try to capture the generalized condition of a "cool" day (ambient temperature less than 60 degrees Fahrenheit) where the temperature within the interior 12 of the vehicle 10 ("InCarTemp") has not "warmed up" yet and the degree to which the temperature within the interior 12 of the vehicle 10 ("InCarTemp") has not "warmed up" yet. In this disclosure, in the example Pre-established Predictive Activation Models provided below, the Certain Identifiable Conditions "coldInside40," "coldInside30," "coldInside20," and "coldInside10" may appear and were all defined as true or false conditions generated from other data. The Certain Identifiable Condition "coldInside40" is TRUE (is provided a value of 1, i.e., ">0," in the example Pre-established Predictive Activation Models below) when the ambient temperature ("AirAmb_Te_Actl") is less than 60 degrees Fahrenheit and the temperature differential ("tempDiff" explained above) is less than 40 degrees Fahrenheit. Otherwise, "coldInside40" is FALSE (is provided a value of 0, i.e., "<=0," in the example Pre-established Predictive Activation Models below). The Certain Identifiable Condition "coldInside30" is TRUE (is provided a value of 1, i.e., ">0," in the example Pre-established Predictive Activation Models below) when the ambient temperature ("AirAmb_Te_Actl") is less than 60 degrees Fahrenheit and the temperature differential ("tempDiff" explained above) is less than 30 degrees Fahrenheit. Otherwise, "coldInside30" is FALSE (is provided a value of 0, i.e., "<=0," in the example Pre-established Predictive Activation Models below). The Certain Identifiable Condition "coldInside20" is TRUE (is provided a value of 1, i.e., ">0," in the example Pre-established Predictive Activation Models below) when the ambient temperature ("AirAmb_Te_Actl") is less than 60 degrees Fahrenheit and the temperature differential ("tempDiff" explained above) is less than 20 degrees Fahrenheit. Otherwise, "coldInside20" is FALSE (is provided a value of 0, i.e., "<=0," in the example Pre-established Predictive Activation Models below). The Certain Identifiable Condition "coldInside10" is TRUE (is provided a value of 1, i.e., ">0," in the example Pre-established Predictive Activation Models below) when the ambient temperature ("AirAmb_Te_Actl") is less than 60 degrees Fahrenheit and the temperature differential ("tempDiff" explained above) is less than 10 degrees Fahrenheit. Otherwise, "coldInside10" is FALSE (is provided a value of 0, i.e., "<=0," in the example Pre-established Predictive Activation Models below). Thus, all of these defined conditions will be FALSE when the ambient temperature ("AirAmb_Te_Actl") is 60 degrees Fahrenheit or greater (i.e., a "warm" day), a day perhaps when a user would not want the heating element 18 activated. Further, "coldInside10" might capture (be TRUE, ">0") a generalized scenario of a "cool" day (below 60 degrees Fahrenheit) where the interior 12 of the vehicle 10 has not "warmed up" yet (thus, the "tempDiff" being less than 10 degrees Fahrenheit), a scenario perhaps when a user would want the heating element 18 activated. Although "coldInside20," "coldInside30," and "coldInside40" will also be TRUE (">0") under the same generalized scenario, the conditions "coldInside20," "coldInside30," and "coldInside40" will sequentially begin to turn FALSE ("<=0") as the interior 12 of the vehicle 10 "warms up," causing the temperature differential ("tempDiff") between the in-vehicle 10 temperature ("InCarTemp") and the ambient temperature ("AirAmb_Te_Actl") to rise. For example, as the interior 12 "warms up," the temperature differential ("tempDiff") might rise from 9 to 21 degrees, in which case "coldInside10" and "coldInside20" would turn from TRUE to FALSE as 21 degrees is greater than both 10 degrees and 20 degrees.

As yet another example, Certain Identifiable Conditions identifying whether the blower of the vehicle 10 was blowing heated air into the interior 12 with low, medium, or high blower speed when the operator occupants of the Test Vehicles activated the rear defrost heating element 18 ("turnOnHeat1," "turnOnHeat2," "turnOnHeat3," respectively) was derived from the Certain Identifiable Conditions of the set point temperature for air directed toward the seating assembly 34 for the operator occupant ("Front_Left_Temp_Setpt") and the level at which the vehicle's climate control system was blowing air ("RCCM_Fr_Rr_Blower_Req" or "Front_Rear_Blower_Req").

Other analyses of the data from the Test Vehicles or other test vehicles could result in the Pre-established Predictive Activation Model further including data related to the following concepts as relevant Certain Identifiable Conditions: the set point temperature for air directed toward a seating assembly 55 of the vehicle 10, which is disposed next to a seating assembly for the operator occupant ("Front_Rt_Temp_Setpt"); whether a door of the vehicle 10 is open or closed ("door_status"); whether the headlamps of the vehicle 10 were activated or deactivated ("headlamp_status"); whether the windshield wipers of the vehicle 10 had been manually activated or deactivated ("windshield_wiper_status"); whether a heating or cooling element internal to one or more of the seating assemblies in the vehicle 10, such as seating assemblies 34, 55, were activated and, if so, at what level ("RCCM_DF_Cond_Seat_Req", "RCCM_DF_Cond_Seat_Lvl"; "RCCM_PF_Cond_Seat_Req"; "RCCM_PF_Cond_Seat_Lvl"; "Pass_Rr_Cond_Seat_Req"; "Pass_Rr_Cond_Seat_Lvl"; "Pass_Fr_Cond_Seat_Req"; "Pass_Fr_Cond_Seat_Lvl"; "Drvr_Rr_Cond_Seat_Req"; "Drvr_Rr_Cond_Seat_Lvl"; "Drvr_Fr_Cond_Seat_Req"; "Drvr_Fr_Cond_Seat_Lvl"); miscellaneous climate control settings (e.g., "Overriding_ModeReq,"); sunlight level; if the vehicle 10 includes temperature and humidity sensors, the relative humidity in the interior 12 of the vehicle 10, the temperature within the vehicle 10; whether the engine of the vehicle 10 was activated or deactivated; trip-related statistics, such as trip length, trip frequency, trip characterization (such as commute versus leisure), GPS positioning (such as latitude and longitude), road grade, altitude, city versus country driving, highway versus city road, torque, braking, idle time; and other time-related concepts, such as day of the week (Monday, Tuesday, etc.).

The identifiers above noted in quotations within parentheses are provided to help decipher the example Pre-established Predictive Activation Model reproduced below. Several identifiers may relate to the same concept. For example, "AirAmb_Te_Actl" and "AirAmb_Te_Actl_UB" both relate to the temperature outside of the vehicle 10 (i.e., ambient temperature). Before analyzing the data relating to the Certain Identifiable Conditions to generate the Pre-established Predictive Activation Model and the Pre-established Predictive Level Model, it may be advantageous to consolidate the several identifiers into one identifier. For example, data with the identifier "AirAmb_Te_Act_UB" may essentially be duplication of "AirAmb_Te_Act" and may be removed entirely from the data before analyzing to generate the Pre-established Predictive Activation Model.

In general, by analyzing data related to the Certain Identifiable Conditions from the Test Vehicles, it can be determined what the Certain Identifiable Conditions were when the operator of a Test Vehicle made the decision to activate the heating element 18 in thermal communication with the rear windshield 14 and made the decision to deactivate the heating element 18. The Pre-established Predictive Activation Model can then be generated, establishing rules as a function of the data related to the Certain Identifiable Conditions that satisfied a certain percentage of instances when the operators of the Test Vehicles made the decision to activate/deactivate the heating element 18, as the case may be. In other words, by modeling past operator behavior demonstrated in the Test Vehicles, the Pre-established Predictive Activation Model can be generated and used to predict the future desires of the operator occupant in the vehicle 10 regarding activation/deactivation of the heating element 18 and automatically control the activation/deactivation thereof without the need for the operator occupant to interact with the user interface 32.

The Pre-established Predictive Activation Model can be derived from the data related to the Certain Identifiable Conditions that were collected from the Test Vehicles en masse. Alternatively, the data related to the Certain Identifiable Conditions collected from the Test Vehicles can be first segmented into segments (hereinafter "Segments") based on criteria such as vehicle type (make, model, year, options), operator demographics, and operator type (such as a primarily city driver, a primarily highway driver, ratio of highway to city miles driven, an "aggressive" or "passive" operator as considered through torque, vehicle speed, engine RPM, fuel economy, and so on, relative usage of vehicle climate features, average trip length, etc.). Separate Pre-established Predictive Activation Models can be generated for each Segment chosen using data generated only by the Test Vehicle of that particular Segment. In other words, if a formed Segment is for a certain make/model of the vehicle 10 and primarily highway driving, then only data from the Test Vehicles of that make/model that were used primarily for highway driving would be utilized to generate a Pre-established Predictive Activation Model for that Segment. If the user of the vehicle 10 is identified as belonging also to that Segment, then the controller 22 would initially utilize the Pre-established Predictive Activation Model generated from that Segment of the Test Vehicles to govern future automatic activation/deactivation of the heating element 18 of the vehicle 10. The assumption is that an operator and vehicle falling into one Segment will exhibit different patterns of activating and deactivating the heating element 18 than operators and vehicles that fall into another Segment. Thus, one Pre-established Predictive Activation Model can be derived for one Segment and another Pre-established Predictive Activation Model can be derived for another Segment, and so on. The segmentation of the data collected from the Test Vehicles to form the Segments can be performed through a k-means cluster algorithm.

The controller 22 can include the Pre-established Predictive Activation Model generated from each Segment but, as a default, initially utilize only the Pre-established Predictive Activation Model for one particular Segment for the activation/deactivation of the heating element 18, such as a Segment perhaps based on make and model of the vehicle 10. Data can then be collected relating to the Certain Identifiable Conditions while the operator occupant begins to operate the vehicle 10 for a certain period of time. This data can then be compared to the Segments to determine to which of the Segments the operator occupant of the vehicle 10 is most similar. Then, the controller 22 can subsequently utilize the Pre-established Predictive Activation Model generated from that more relatable Segment. For example, one of the Segments might be data from the subset of the Test Vehicles that were mainly driven on highways and the operator occupant might mainly drive the vehicle 10 on highways as well. The Pre-established Predictive Activation Model derived from that particular Segment can then be the Pre-established Predictive Activation Model utilized by the controller 22 thereafter (until subsequent revision and reiteration as discussed below).

The Pre-established Predictive Activation Model can be formed pursuant to a classification and regression tree ("CART") analysis of the data related to the Certain Identifiable Conditions collected from the Test Vehicles en masse or Segmented (resulting in Pre-established Predictive Activation Model for each Segment), as explained above. There are a variety of CART analyses that can provide useful results, including the C.50 program (Release 2.07 GPL Edition, available from www.rulequest.com), the M5P classifier, as implemented in Weka (available from http://weka-.sourceforge.net/doc.stable/weka/classifiers/trees/M5P.html), and the Random Tree classifier, as implemented in Weka (available from http://weka.sourceforge.net/doc.dev/weka/classifiers/trees/RandomTree.html) There are other CART analyses available and this is not meant to be an exhaustive list.

A first example Pre-established Predictive Activation Model formed pursuant to the C.50 program CART analysis is set forth below. This example Pre-established Predictive Activation Model sets forth the rules of the activation/deactivation of the heating element 18 to impart heating to the rear windshield 14 as a function of data relating to the Certain Identifiable Conditions.

```
isMorning <= 0: 0 (632)
isMorning > 0:
:...Smart_Wiper_Motor_Stat > 0.032:
    :...AirAmb_Te_Actl > 6.398602: 0 (6)
    :   AirAmb_Te_Actl <= 6.398602:
    :   :...tempDiff <= 13.07087: 1 (11/1)
    :       tempDiff > 13.07087: 0 (2)
    Smart_Wiper_Motor_Stat <= 0.032:
    :...AC_Request <= 0.1168831:
        :...accelerator_pedal_position <= 76: 0 (178/4)
        :   accelerator_pedal_position > 76:
        :   :...AirAmb_Te_Actl <= 5: 0 (30/2)
        :       AirAmb_Te_Actl > 5: 1 (5)
        AC_Request > 0.1168831:
        :...InCarTemp <= 12.35455:
            :...AC_Request <= 0.9759036: 1 (8)
            :   AC_Request > 0.9759036:
            :   :...AirAmb_Te_Actl <= -1.402311: 1 (9)
            :       AirAmb_Te_Actl > -1.402311:
            :       :...InCarTemp <= 11.78846: 0 (27/7)
            :           InCarTemp > 11.78846: 1 (3)
            InCarTemp > 12.35455:
            :...AirAmb_Te_Actl > 6.681353: 0 (37)
                AirAmb_Te_Actl <= 6.681353:
            :...AirAmb_Te_Actl <= 0.05803571: 0 (11)
                AirAmb_Te_Actl > 0.05803571:
                :...accelerator_pedal_position > 15.488:
                    :...AirAmb_Te_Actl <= 1.016393: 1 (2)
                    : AirAmb_Te_Actl > 1.016393: 0 (26)
                    accelerator_pedal_position <= 15.488:
                    :...coldInside 10 > 0: 1 (3)
```

-continued

```
coldInside 10 <= 0:
  :...EngAout_N_Actl <= 1336.348: 0 (6)
     EngAout_N_Actl > 1336.348: 1 (5)
```

Those skilled in the art will understand how to decipher the above Pre-Established Predictive Activation Model. Each line includes an identifier related to a specific Certain Identifiable Condition. For example, the first line "isMorning<=0: 0" includes the identifier "isMorning," which as set forth above means whether the time of the day falls within the morning. Each line includes a value related to the preceding Certain Identifiable Condition. For example, the first line "isMorning<=0: 0" includes the value "0,"(the first "0," reading left to right) which in this instance means "FALSE." Each line includes a conditional statement, specifically either ">" which means "greater than" or "<=" which means "less than or equal to." Some lines include an identifier after the colon ":" with "0" identifying deactivation of the heating element 18 and "1" identifying activation of the heating element 18. Lines without an identifier after the colon ":" should be read as meaning "and." For example, the first line "isMorning<=0: 0" can be read to mean "if it is FALSE that the time of the day is morning, then the heating element 18 is deactivated" or more simply "if it is not morning, then the heating element 18 is not activated (or deactivated if the heating element 18 is already activated)." The reading would then proceed to the second line. The second line "isMorning>0:" can be read to mean "if it is TRUE that the time of the day is morning, and . . . ." The reading then proceeds to the third line, which is indented and otherwise identified as subservient to the second line. The third line "Smart_Wiper_Motor_Stat >0.032" can be read as a TRUE or FALSE statement to mean "if it is TRUE that there is sufficient moisture on the front windshield 30 so as to cause activation of automatically activated wipers to wipe the front windshield 30, and . . . ." The reading then proceeds to the fourth line "AirAmb_Te_Actl >6.398602: 0," which can be read as "if the temperature of the external environment 16 is greater than 6.398602° C., then the heating element 18 is not activated (or deactivated if the heating element 18 is already activated)." Thus, the second, third, and fourth lines can be read together as "if it is TRUE that the time of day is morning, AND if it is TRUE that there is sufficient moisture on the front windshield 30 so as to cause activation of automatically activated wipers to wipe the front windshield 30, AND the temperature of the external environment 16 is greater than 6.398602° C., THEN the heating element 18 is not activated (or deactivated if the heating element 18 is already activated)." In contrast, the second, third, fifth, and sixth lines together could be read as "if it is TRUE that the time of day is morning, AND if it is TRUE that there is sufficient moisture on the front windshield 30 so as to cause activation of automatically activated wipers to wipe the front windshield 30, AND the temperature of the external environment 16 is less than or equal to 6.398602° C., AND the difference in temperature between the temperature within the interior 12 of the vehicle 10 and the temperature of the external environment 16 is less than or equal to 13.07087° C., THEN the heating element 18 is activated" (the ":1" designating activation of the heating element 18).

Figure 8A:
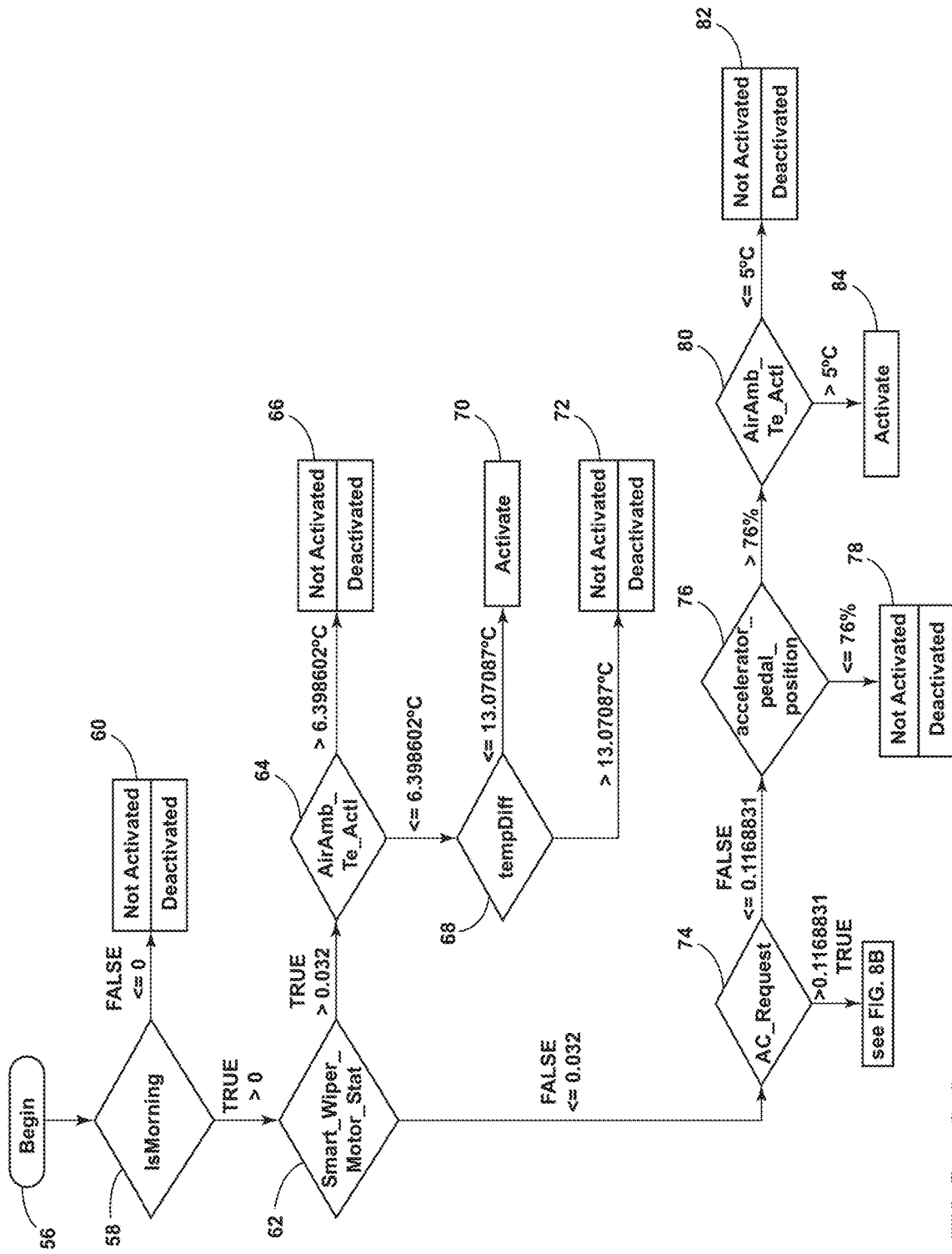
FIGS. 8A-8C are flow diagrams of the rules of a first example pre-established predictive activation model illustrating under what certain identifiable conditions, as supplied as input data from the data sources, the controller would activate or not activate/deactivate the heating element.
Figure 8B:
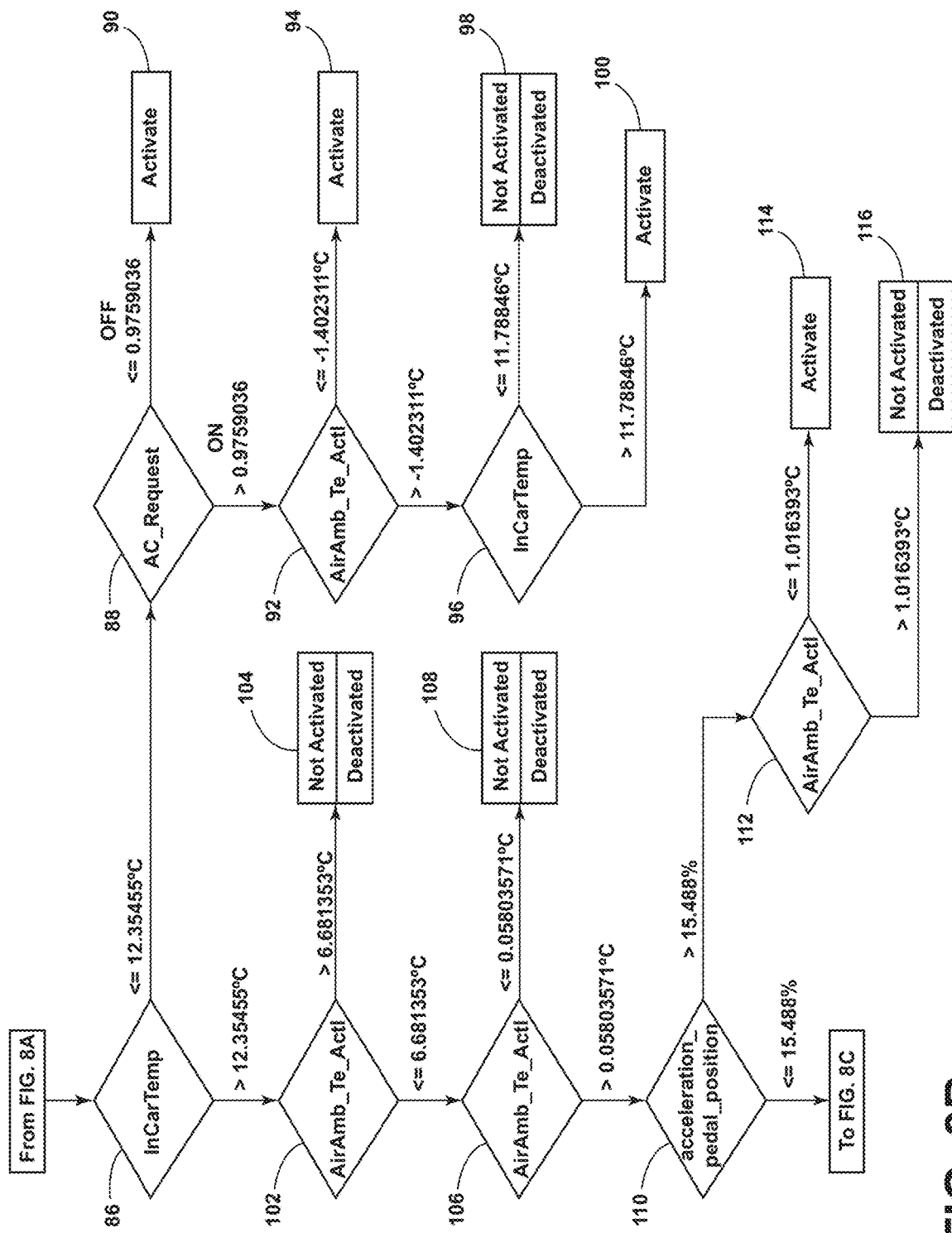
Figure 8C:
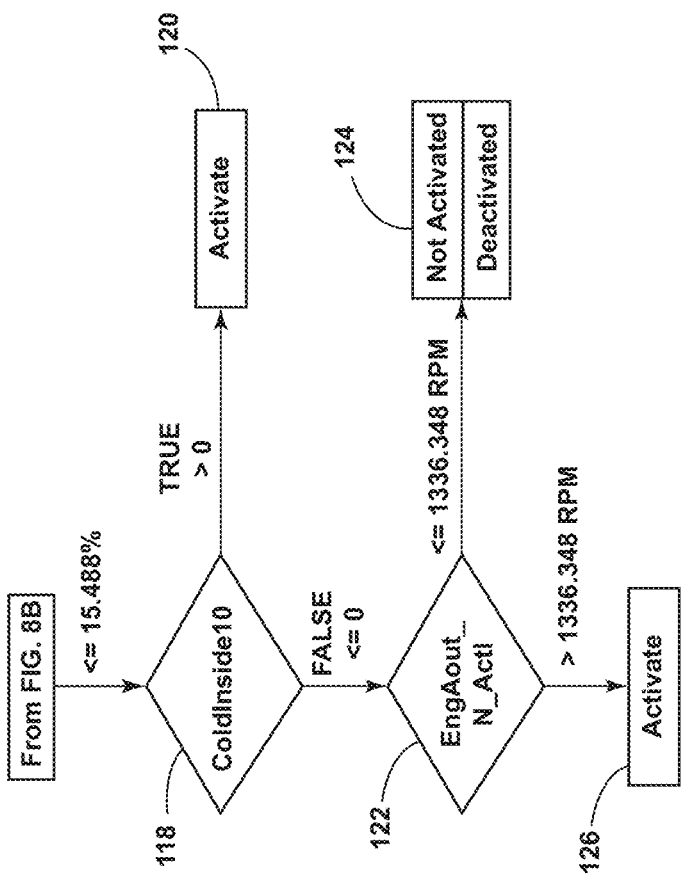

This first example Pre-established Predictive Action Model is now considered more specifically in conjunction with FIGS. 8A-8C. At step 56, the controller 22 begins the process of comparing the collected data to the Pre-established Predictive Activation Model (step 50 in the overall process illustrated in FIG. 7). After step 56, the controller 22 proceeds to step 58, where the controller 22 determines from time data whether the time of the day is a morning time ("isMorning"). If at step 58 the controller 22 determines that the time of day is not a morning time ("isMorning<=0" meaning FALSE) then the controller 22 proceeds to step 60 and does not activate the heating element 18 or deactivates the heating element 18 if previously already automatically activated by the controller 22. If at step 58 the controller 22 determines that the time of the day is a morning time ("isMorning>0:"), then the controller 22 proceeds to step 62. At step 62, the controller 22 determines whether there is sufficient moisture on the front windshield 30 so as to cause activation of automatically activated wipers to wipe the front windshield 30. If at step 62 the controller 22 determines that there is sufficient moisture on the front windshield 30 so as to cause activation of automatically activated wipers to wipe the front windshield 30 ("Smart Wiper Motor Stat>0.032" i.e., TRUE), then the controller 22 proceeds to step 64. At step 64, the controller 22 determines whether the temperature of the external environment 16 is greater than a certain temperature (6.398602° C.) or less than/equal to that certain temperature. If at step 64 the controller 22 determines that the temperature of the external environment 16 is greater than a certain temperature ("AirAmb_Te_Actl >6.39860"), then the controller 22 proceeds to step 66 and does not activate the heating element 18 or deactivates the heating element 18 if previously already automatically activated by the controller 22. However, if at step 64 the controller 22 determines the temperature of the external environment 16 is less than or equal to the certain temperature ("AirAmb_Te_Actl<=6.398602"), then the controller 22 proceeds to step 68. At step 68 the controller 22 determines whether the difference in temperature between the temperature within the interior 12 of the vehicle 10 and the temperature of the external environment 16 ("tempDiff") is less than/equal to a certain value (13.07087° C.) or greater than the certain value. If at step 68 the controller 22 determines that the difference in temperature between the temperature within the interior 12 of the vehicle 10 and the temperature of the external environment 16 is less than/equal to the certain value ("tempDiff<=13.07087"), then the controller 22 proceeds to step 70 and activates the heating element 18.

This sequence of the first example thus far illustrates an instance where when the time of the day is a morning time, the controller 22 activates the heating element 18 pursuant to the rules of this example Pre-established Predictive Activation Model as a function of data related to at least one other of the Certain Identifiable Conditions excluding the time of the day. As mentioned above, the controller 22 constantly analyzes the input data from the data sources 28 related to the Certain Identifiable Conditions. Therefore, for example, if the controller 22 determines 22 that the time of day is no longer within the certain period of morning time (at step 58, "isMorning<=0"), then the controller 22 deactivates the heating element 18 (at step 60).

In addition, this sequence illustrates an instance where when the time of day is not a morning time, the controller 22 does not activate the heating element 18 pursuant to the rules of the Pre-established Predictive Activation Model, but when the time of day is a morning time, the controller 22 activates the heating element 18 pursuant to the rules of the Pre-established Predictive Activation Model as a function of at least: (i) the temperature of the external environment 16; (ii) whether there is sufficient moisture on a front windshield 30 of the vehicle 10 so as to cause activation of automatically activated wipers to wipe the front windshield 30; and (iii) the difference in temperature between the temperature within an interior 12 of the vehicle 10 and the temperature of the external environment 16.

If at step 68 the controller 22 determines that the difference in temperature between the temperature within the interior 12 of the vehicle 10 and the temperature of the external environment 16 is greater than the certain value ("tempDiff>13.07087"), then the controller 22 proceeds to step 72 and does not activate the heating element 18 or deactivates the heating element 18 if previously already automatically activated by the controller 22.

Returning now to step 62, if the controller 22 determines that there is not sufficient moisture on the front windshield 30 so as to cause activation of automatically activated wipers to wipe the front windshield 30 ("Smart_Wiper_Motor_Stat<=0.032" i.e., FALSE), then the controller 22 proceeds to step 74. At step 74, the controller 22 determines whether an air conditioning function has been activated ("AC_Request"). If at step 74 the controller 22 determines that the air conditioning function has not been activated ("AC_Request<=0.1168831" that is, FALSE), then the controller 22 proceeds to step 76. At step 76, the controller 22 determines whether the relative positioning of the accelerator pedal ("accelerator_pedal_position ") is less than/equal or greater to a certain value (76% depressed). If at step 76 the controller 22 determines that the relative positioning of the accelerator pedal is less than/equal to the certain value ("accelerator_pedal_position<=76"), then the controller 22 proceeds to step 78 and does not activate the heating element 18 or deactivates the heating element 18 if previously already automatically activated by the controller 22. However, if at step 76 the controller 22 determines that the relative positioning of the accelerator pedal is greater than the certain value ("accelerator_pedal_position>76"), then the controller 22 proceeds to step 80. At step 80, the controller 22 determines whether the temperature of the external environment 16 ("AirAmb_Te_Actl") is less than/equal to or greater than a certain temperature (5° C.). If at step 80 the controller 22 determines that the temperature of the external environment 16 is less than/equal to the certain temperature ("AirAmb_Te_Actl<=5"), then the controller 22 proceeds to step 82 and does not activate the heating element 18 or deactivates the heating element 18 if previously already automatically activated by the controller 22. However, if the controller 22 determines that the temperature of the external environment 16 is greater than the certain temperature ("AirAmb_Te_Actl >5"), then the controller 22 proceeds to step 84 and activates the heating element 18.

Returning now to step 74, if the controller 22 determines that air conditioning function has been activated ("AC_Request>0.1168831" that is, TRUE), then the controller 22 proceeds to step 86. At step 86, the controller 22 determines whether the temperature within the interior 12 of the vehicle 10 ("InCarTemp") is less than/equal to or greater than a certain temperature (12.35455° C.). If at step 86 the controller 22 determines that the temperature within the interior 12 of the vehicle 10 is less than/equal to the certain temperature ("InCarTemp<=12.35455"), then the controller 22 proceeds to step 88. At step 88, the controller 22 determines whether the air conditioning function has been activated ("AC_Request"). If at step 88 the controller 22 determines that the air conditioning function has not been activated ("AC_Request<=0.9759036" that is, FALSE), then the controller 22 proceeds to step 90 and activates the heating element 18. However, if at step 88 the controller 22 determines that air conditioning function has been activated ("AC_Request>0.9759036" that is, TRUE), then the controller 22 proceeds to step 92. At step 92, the controller 22 determines whether the temperature of the external environment 16 ("AirAmb_Te_Actl") is less than/equal to or greater than a certain temperature (−1.402311° C.). If at step 92 the controller 22 determines that the temperature of the external environment 16 is less than/equal to the certain temperature ("AirAmb_Te_Actl<=−1.402311"), then the controller 22 proceeds to step 94 and activates the heating element 18. However, if at step 92 the controller 22 determines that the temperature of the external environment 16 is greater than the certain temperature ("AirAmb_Te_Actl>1.402311"), then the controller 22 proceeds to step 96. At step 96, the controller 22 determines whether the temperature within the interior 12 of the vehicle 10 ("InCarTemp") is less than/equal to or greater than a certain temperature (11.78846° C.). If at step 96 the controller 22 determines that the temperature within the interior 12 of the vehicle 10 is less than/equal to the certain temperature ("InCarTemp<=11.78846"), then the controller 22 proceeds to step 98 and does not activate the heating element 18 or deactivates the heating element 18 if previously already automatically activated by the controller 22. However, if at step 96, the controller 22 determines that the temperature within the interior 12 of the vehicle 10 is greater than the certain temperature ("InCarTemp>11.78846"), then the controller 22 proceeds to step 100 and activates the heating element 18.

Returning now to step 86, if the controller 22 determines that the temperature within the interior 12 of the vehicle 10 is greater than the certain temperature ("InCarTemp>12.35455"), then the controller 22 proceeds to step 102. At step 102, the controller 22 determines whether the temperature of the external environment 16 ("AirAmb_Te_Actl") is less than/equal to or greater than a certain temperature (6.681353° C.). If at step 102 the controller 22 determines that the temperature of the external environment 16 is greater than the certain temperature ("AirAmb_Te_Actl>6.681353"), then the controller 22 proceeds to step 104 and does not activate the heating element 18 or deactivates the heating element 18 if previously already automatically activated by the controller 22. However, if at step 104 the controller 22 determines that the temperature of the external environment 16 is less than/equal to the certain temperature ("AirAmb_Te_Actl<=6.681353"), then the controller 22 proceeds to step 106. At step 106, the controller 22 determines whether the temperature of the external environment 16 ("AirAmb_Te_Actl") is less than/equal to or greater than a certain temperature (0.05803571° C.). If at step 106 the controller 22 determines that the temperature of the external environment 16 is less than/equal to the certain temperature ("AirAmb_Te_Actl<=0.05803571"), then the controller 22 proceeds to step 108 and does not activate the heating element 18 or deactivates the heating element 18 if previously already automatically activated by the controller 22. However, if at step 106 the controller 22 determines that the temperature of the external environment 16 is greater than the certain temperature ("AirAmb_Te_Actl>0.05803571"), then the controller 22 proceeds to step 110. At step 110, the controller 22 determines whether the relative positioning of the accelerator pedal ("accelerator_pedal_position") is less than/equal or greater to a certain value (15.488%). If at step 110 the controller 22 determines that the relative positioning of the accelerator pedal is greater than the certain value ("accelerator_pedal_position>15.488"), then the controller 22 proceeds to step 112. At step 112, the controller 22 determines whether the temperature of the external environment 16 ("AirAmb_Te_Actl") is less than/equal to or greater than a certain temperature (1.016393° C.). If at step 112, the controller 22 determines that the temperature of the external environment 16 is less than/equal to the certain temperature ("AirAmb_Te_Actl<=1.016393"), then the controller 22 proceeds to step 114 and activates the heating element 18. However, if at step 112 the controller 22 determines that the temperature of the external environment 16 is greater than the certain temperature ("AirAmb_Te_Actl>1.016393"), then the controller 22 proceeds to step 116 and does not activate the heating element 18 or deactivates the heating element 18 if previously already automatically activated by the controller 22.

Returning now to step 110, if the controller 22 determines that the relative positioning of the accelerator pedal is less than/equal to the certain value ("accelerator_pedal_position<=15.488"), then the controller 22 proceeds to step 118. At step 118, the controller 22 determines whether the defined condition of "coldInside10" is TRUE or FALSE. If at step 118 the controller 22 determines that the defined condition of "coldInside10" is TRUE ("coldInside10>0"), then the controller 22 proceeds to step 120 and activates the heating element 18. However, if at step 118 the controller 22 determines that the defined condition of "coldInside10" is FALSE ("coldInside10<=0"), then the controller 22 proceeds to step 122. At step 122, the controller 22 determines whether the speed of the engine of the vehicle 10 ("EngAout_N_Actl") is less than/equal to or greater than a certain value (1336.348 revolutions per minute "RPM"). If at step 122, the controller 22 determines that the speed of the engine of the vehicle 10 is less than/equal to the certain value ("EngAout_N_Actl<=1336.348"), then the controller 22 proceeds to step 124 and does not activate the heating element 18 or deactivates the heating element 18 if previously already automatically activated by the controller 22. However, if at step 122 the controller 22 determines that the speed of the engine of the vehicle 10 is greater than the certain value ("EngAout_N_Actl>1336.348"), then the controller 22 proceeds to step 126 and activates the heating element 18.

A second example Pre-established Predictive Activation Model formed pursuant to the C.50 program CART analysis is set forth below. This second example Pre-established Predictive Activation Model sets forth the rules of the activation/deactivation of the heating element 18 to impart heating to the rear windshield 14 as a function of data relating to the Certain Identifiable Conditions.

```
InCarTemp > 20.87025: 0 (740/6)
InCarTemp <= 20.87025:
:...AC_Request <= 0.09473684: 0 (103/2)
  AC_Request > 0.09473684:
  :...isMorning <= 0:
    :...accelerator_pedal_position <= 37.77778: 0 (24/1)
    : accelerator_pedal_position > 37.77778: 1 (7)
    isMorning > 0:
    :...turnOnHeat3 <= 0:
    :...InCarTemp <= 18.89394: 1 (25)
    : InCarTemp > 18.89394:
    :...coldInside10 > 0: 1 (8/1)
    : coldInside10 <= 0:
    : :...Veh_V_ActlEng <= 102.5182: 0 (8/1)
    :   Veh_V_ActlEng > 102.5182: 1 (2)
    turnOnHeat3 > 0:
      :...tempDiff > 6.829852: 0 (18)
       tempDiff <= 6.829852:
       :...tempDiff <= 0.06457081: 0 (9/1)
        tempDiff > 0.06457081:
        :...EngAout_N_Actl > 1559.019: 1 (11)
          EngAout N Actl <= 1559.019:
```

-continued

```
:...tempDiff > 3.732296: 0 (9/2)
   tempDiff <= 3.732296:
   :...AirAmb_Te_Actl <= 5.606287: 1 (6)
      AirAmb_Te_Actl > 5.606287:
      :...AirAmb_Te_Actl <= 6.28125: 0 (3)
         AirAmb_Te_Actl > 6.28125: 1 (4)
```

Figure 9A:
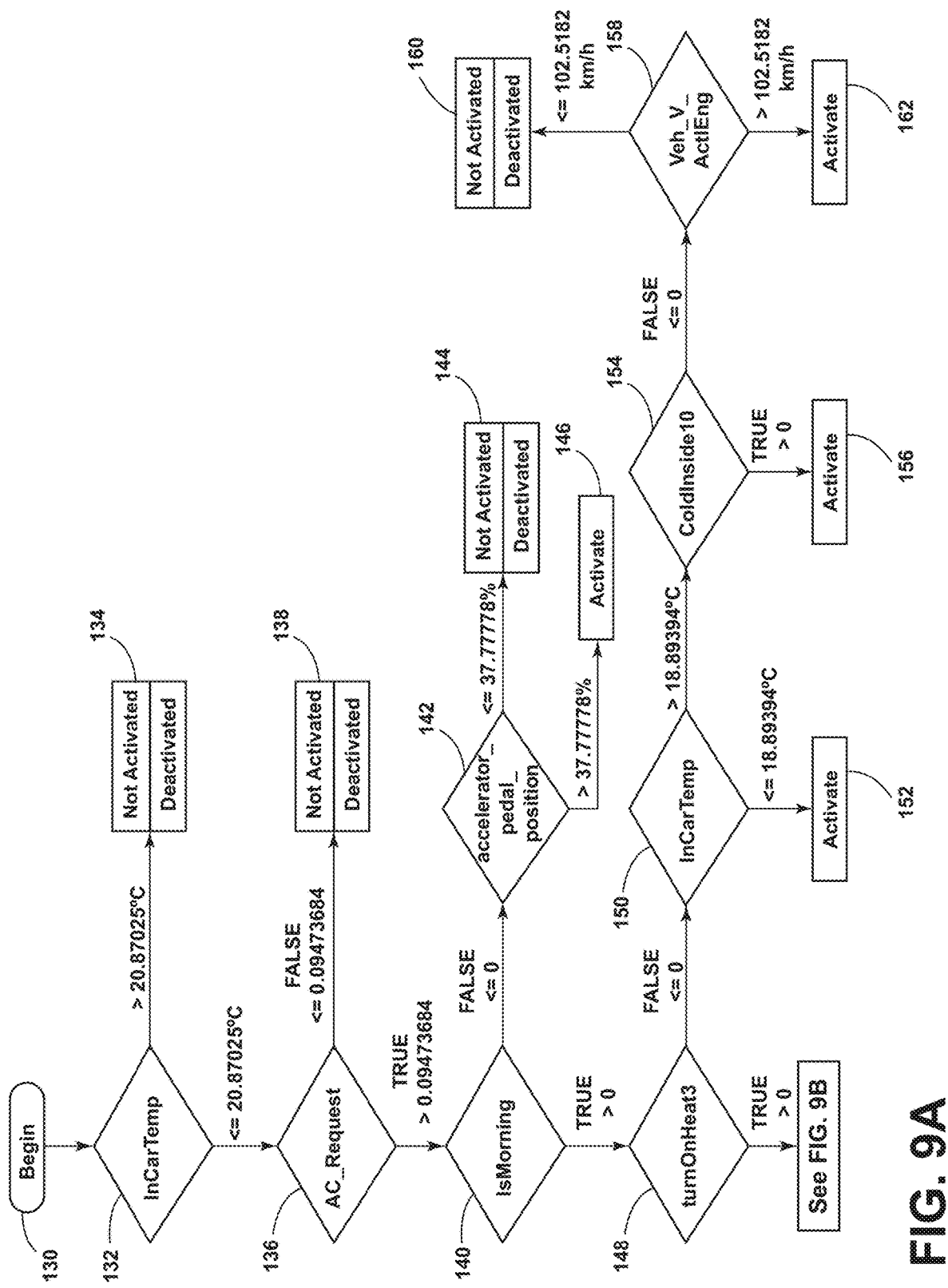
FIGS. 9A-9B are flow diagrams of the rules of a second example pre-established predictive activation model illustrating under what certain identifiable conditions, as supplied as input data from the data sources, the controller would activate or not activate/deactivate the heating element.
Figure 9B:
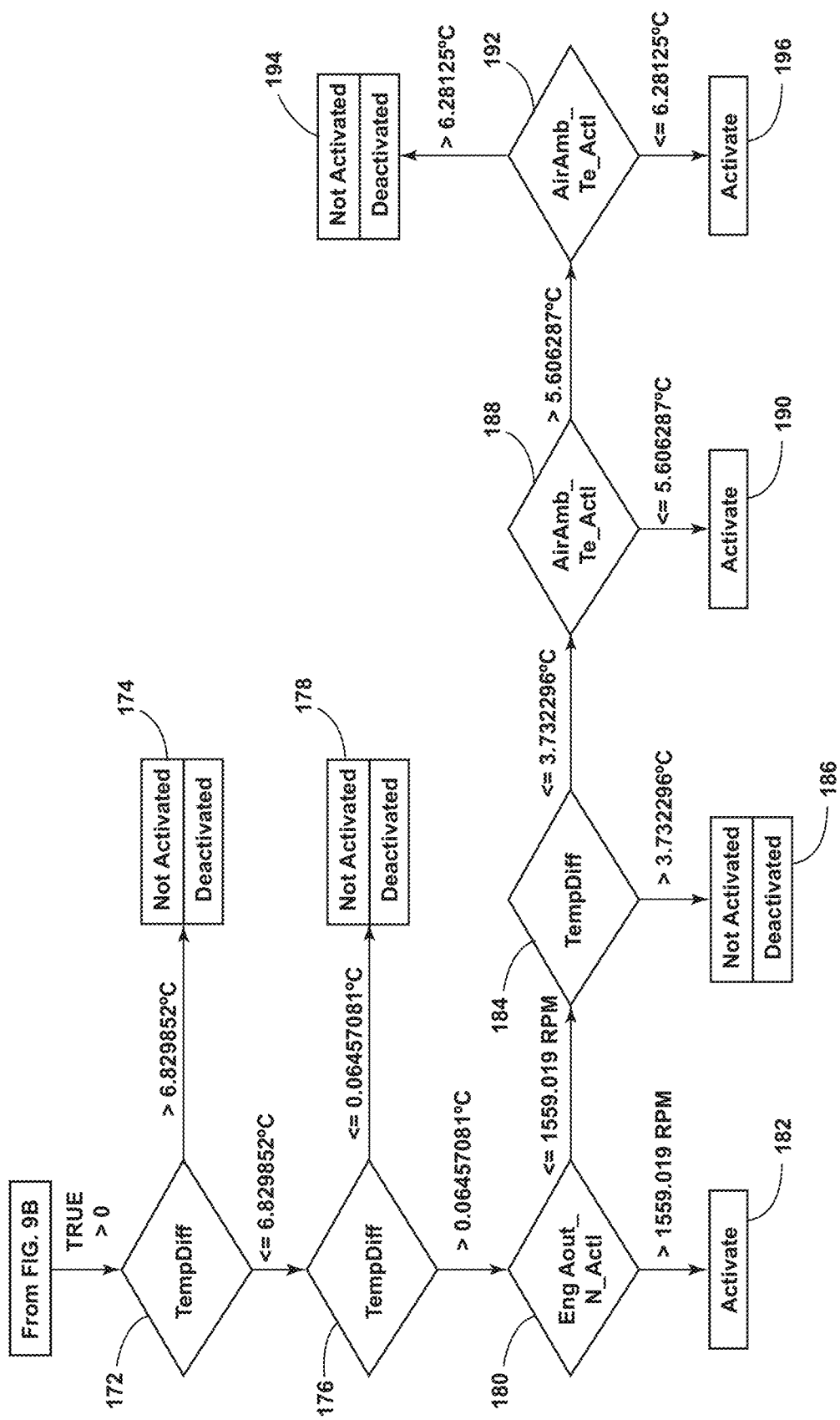

Referring now to FIGS. 9A-9B, at step 130, the controller 22 begins the process of comparing the collected data to the Pre-established Predictive Activation Model (step 50 in the overall process illustrated in FIG. 7). The controller 22 then proceeds to step 132, where the controller 22 determines whether the temperature within the interior 12 of the vehicle 10 ("InCarTemp") is greater than or less than/equal to a certain value (20.87025° C.). If at step 132 the controller 22 determines that the temperature within the interior 12 of the vehicle 10 is greater than the certain value ("InCarTemp>20.87025"), then the controller 22 proceeds to step 134 and does not activate the heating element 18 or deactivates the heating element 18 if previously already automatically activated by the controller 22. However, if at step 132 the controller 22 determines that the temperature within the interior 12 of the vehicle 10 is less than/equal to the certain value ("InCarTemp<=20.87025"), then the controller 22 proceeds to step 136. At step 136, the controller 22 determines whether an air conditioning function has been activated ("AC_Request"). If at step 136 the controller 22 determines that the air conditioning function has not been activated ("AC_Request<=0.09473684" that is, FALSE), then the controller 22 proceeds to step 138 and does not activate the heating element 18 or deactivates the heating element 18 if previously already automatically activated by the controller 22. However, if at step 136 the controller 22 determines that the air conditioning function has been activated ("AC_Request>0.09473684" that is, TRUE), then the controller 22 proceeds to step 140. At step 140, the controller 22 determines whether the time of day is morning ("isMorning"). If at step 140, the controller 22 determines that the time of day is not morning ("isMorning<=0" that is, FALSE), then the controller 22 proceeds to step 142. At step 142, the controller 22 determines whether the relative position of the accelerator pedal ("accelerator_pedal_position") is less than/equal to or greater than a certain value (37.77778 percent). If at step 142 the controller 22 determines that the relative positon of the accelerator pedal is less than/equal to the certain value ("accelerator_pedal_position<=37.77778"), then the controller 22 proceeds to step 144 and does not activate the heating element 18 or deactivates the heating element 18 if previously already automatically activated by the controller 22. However, if at step 142 the controller 22 determines that the relative positon of the accelerator pedal is greater than the certain value ("accelerator_pedal_position>37.77778"), then the controller 22 proceeds to step 146 and activates the heating element 18.

This sequence illustrates an example where, according to the rules of the second example Pre-established Predictive Activation Model, the controller 22 activates the heating element 18 if the temperature in the interior 12 of the vehicle 10 is below a certain temperature (in this example, 20.87025° C.) and one or more (here, numerous) of the other Certain Identifiable Conditions are satisfied. More specifically, in this second example Pre-established Predictive Activation Model, when the temperature in the interior 12 of the vehicle 10 is below the certain temperature, the air conditioning function has been activated, it is not morning time, and the accelerator pedal is depressed greater than a certain percentage, then the controller 22 activates the heating element 18. However, if the controller 22 determines that the temperature in the interior 12 of the vehicle 10 rises above that certain temperature (20.87025° C.), then the controller 22 deactivates the heating element 18 (steps 132, 134).

Returning now to step 140, if the controller 22 determines that the time of day is not morning ("isMorning>0" that is, TRUE), then the controller 22 proceeds to step 148. At step 148, the controller 22 determines whether the blower of the vehicle 10 is blowing heated air into the interior 12 with high blower speed ("turnOnHeat3"). If at step 148 the controller 22 determines that the blower of the vehicle 10 is not blowing heated air into the interior 12 with high blower speed ("turnOnHeat3<=0" that is, FALSE), then the controller 22 proceeds to step 150. At step 150, the controller 22 determines whether the temperature within the interior 12 of the vehicle 10 ("InCarTemp") is greater than or less than/equal to a certain value (18.89394° C.). If at step 150 the controller 22 determines that the temperature within the interior 12 of the vehicle 10 is less than/equal to the certain value ("InCarTemp<=18.89394"), then the controller 22 proceeds to step 152 and activates the heating element 18. However, if at step 150 the controller 22 determines that the temperature within the interior 12 of the vehicle 10 is greater than the certain value ("InCarTemp>18.89394"), then the controller 22 proceeds to step 154. At step 154, the controller 22 determines whether the defined condition "coldInside10" is satisfied. If at step 154 the controller 22 determines that the defined condition "coldInside10" is satisfied ("coldInside10>0" that is, TRUE), then the controller 22 proceeds to step 156 and activates the heating element 18. However, if at step 154 the controller 22 determines that the defined condition "coldInside10" is not satisfied ("coldInside10<=0" that is FALSE), then the controller 22 proceeds to step 158. At step 158, the controller 22 determines whether the speed of the vehicle 10 ("Veh_V_ActlEng") is less than/equal or greater than a certain value (102.5182 km/hour). If at step 158 the controller 22 determines that the speed of the vehicle 10 is less than/equal to the certain value ("Veh_V_ActlEng<=102.5182"), then the controller 22 proceeds to step 160 and does not activate the heating element 18 or deactivates the heating element 18 if previously already automatically activated by the controller 22. However, if at step 158 the controller 22 determines that the speed of the vehicle 10 is greater than the certain value ("Veh_V_ActlEng>102.5182"), then the controller 22 proceeds to step 162 and activates the heating element 18.

This sequence of the second example Pre-established Predictive Activation Model illustrates a scenario wherein, the controller 22 activates the heating element 18 if: (i) a blower of the vehicle 10 is blowing heated air into an interior 12 of the vehicle 10 with high blower speed; (ii) the difference in temperature between the temperature within the interior 12 of the vehicle 10 and the temperature of the external environment 16 is within a certain range (greater than 0.06457081° C. but less than/equal to 6.829852° C.; and (iii) the speed of the engine of the vehicle is above a certain value (in this instance 1458.077 RPM). However, the controller 22 deactivates the heating element 18 if the controller 22 determines that the difference in temperature between the temperature within the interior 12 of the vehicle 10 and the temperature of the external environment 16 exceeds the certain range (such as greater than 6.829852° C.).

Returning now to step 148, if the controller 22 determines that the blower of the vehicle 10 is blowing heated air into the interior 12 with high blower speed ("turnOnHeat3>0" that is, TRUE), then the controller 22 proceeds to step 172. At step 172, the controller 22 determines whether the difference in temperature between the temperature within the interior 12 of the vehicle 10 and the temperature of the external environment 16 ("tempDiff") is less than/equal to or greater than a certain value (6.829852° C.). If at step 172 the controller 22 determines that the difference in temperature between the temperature within the interior 12 of the vehicle 10 and the temperature of the external environment 16 is greater than the certain value ("tempDiff>6.829852"), then the controller 22 proceeds to step 174 and does not activate the heating element 18 or deactivates the heating element 18 if previously already automatically activated by the controller 22. However, if at step 172 the controller 22 determines that the difference in temperature between the temperature within the interior 12 of the vehicle 10 and the temperature of the external environment 16 is less than/equal to the certain value ("tempDiff<=6.829852"), then the controller 22 proceeds to step 176. At step 176, the controller 22 determines whether the difference in temperature between the temperature within the interior 12 of the vehicle 10 and the temperature of the external environment 16 ("tempDiff") is less than/equal to or greater than a certain value (0.06457081° C.). If at step 176 the controller 22 determines that the difference in temperature within the interior 12 of the vehicle 10 and the temperature of the external environment 16 is less than/equal to the certain value ("tempDiff<=0.06457081"), then the controller 22 proceeds to step 178 and does not activate the heating element 18 or deactivates the heating element 18 if previously already automatically activated by the controller 22. However, if at step 176 the controller 22 determines that the difference in temperature within the interior 12 of the vehicle 10 and the temperature of the external environment 16 is greater than the certain value ("tempDiff>0.06457081"), then the controller 22 proceeds to step 180. At step 180, the controller 22 determines whether the speed of the engine of the vehicle 10 ("EngAout_N_Actl") is greater than or less than/equal to a certain value (1559.019 RPM). If at step 180 the controller 22 determines that the speed of the engine of the vehicle 10 is greater than the certain value ("EngAout_N_Actl>1559.019"), then the controller 22 proceeds to step 182 and activates the heating element 18. However, if at step 180 the controller 22 determines that the speed of the engine of the vehicle 10 is less than/equal to the certain value ("EngAout_N_Actl<=1559.019"), then the controller 22 proceeds to step 184. At step 184, the controller 22 determines whether the difference in temperature between the temperature within the interior 12 of the vehicle 10 and the temperature of the external environment 16 ("tempDiff") is greater than or less than/equal to a certain value (3.732296° C.). If at step 184 the controller 22 determines that the difference in temperature within the interior 12 of the vehicle 10 and the temperature of the external environment 16 is greater than the certain value ("tempDiff>3.732296"), then the controller 22 proceeds to step 186 and does not activate the heating element 18 or deactivates the heating element 18 if previously already automatically activated by the controller 22. However, if at step 184 the controller 22 determines that the difference in temperature within the interior 12 of the vehicle 10 and the temperature of the external environment 16 is less than/equal to the certain value ("tempDiff<=3.732296"), then the controller 22 proceeds to step 188. At step 188 the controller 22 determines whether the temperature of the external environment 16 ("AirAmb_Te_Actl") is less than/equal to or greater than a certain temperature (5.606287° C.). If at step 184, the controller 22 determines that the temperature of the external environment 16 is less than/equal to the certain temperature AirAmb_Te_Actl<=5.606287"), then the controller 22 proceeds to step 190 and activates the heating element 18. However, if at step 188 the controller 22 determines that the temperature of the external environment 16 is greater than the certain temperature ("AirAmb_Te_Actl>5.606287"), then the controller 22 proceeds to step 192. At step 192 the controller 22 determines whether the temperature of the external environment 16 ("AirAmb_Te_Actl") is less than/equal to or greater than a certain temperature (6.28125° C.). If at step 192, the controller 22 determines that the temperature of the external environment 16 is less than/equal to the certain temperature ("AirAmb_Te_Actl<=6.28125"), then the controller 22 proceeds to step 194 and does not activate the heating element 18 or deactivates the heating element 18 if previously already automatically activated by the controller 22. However, if at step 192 the controller 22 determines that the temperature of the external environment 16 is greater than the certain temperature ("AirAmb_Te_Actl >6.28125"), then the controller 22 activates the heating element 18.

A third example Pre-established Predictive Activation Model formed pursuant to the C.50 program CART analysis is set forth below. This third example Pre-established Predictive Activation Model sets forth the rules of the activation/deactivation of the heating element 18 to impart heat to the rear windshield 14 as a function of data relating to the Certain Identifiable Conditions.

```
Smart_Wiper_Motor_Stat > 0.1348315:
:...coldInside10 <= 0: 1 (31/1)
      coldInside 10 > 0:
        :...AirAmb_Te_Actl > 10.75:
             :...Recirc_Request <= 0.6363636: 1 (2)
             :  Recirc_Request > 0.6363636: 0 (68/8)
             AirAmb_Te _Actl <=10.75:
             :...turnOnHeat1 > 0: 1 (2)
                  turnOnHeat1 <= 0:
                  :...InCarTemp <= 16.81507: 1 (12/2)
                       InCarTemp > 16.81507: 0 (7)
Smart_Wiper_Motor_Stat <= 0.1348315:
:...Recirc_Request <= 0.09756098:
      :... AC_Request <= 0.3676471: 0 (23)
      :  AC_Request > 0.3676471:
      :  :...isMorning <= 0: 0 (7)
              isMorning > 0:
              :...turnOnHeat2 <= 0: 1 (17)
                   turnOnHeat2 > 0:
                   :...EngAout_N_Actl <= 1458.077: 0 (3)
                        EngAout_N_Actl > 1458.077: 1 (7)
      Recirc_Request > 0.09756098:
      :...AirAmb_Te_Actl > 12.37634: 0 (683/3)
           AirAmb_Te_Actl <= 12.37634:
           :... AC_Request <= 0.3461539: 0 (82)
                AC_Request > 0.3461539:
      :...accelerator_pedal_position <= 18.80675: 0 (33/1)
           accelerator_pedal_position > 18.80675:
           :...AirAmb_Te_Actl <= 8.854779: 0 (8/1)
                AirAmb_Te_Actl > 8.854779: 1 (16/1)
```

Figure 10A:
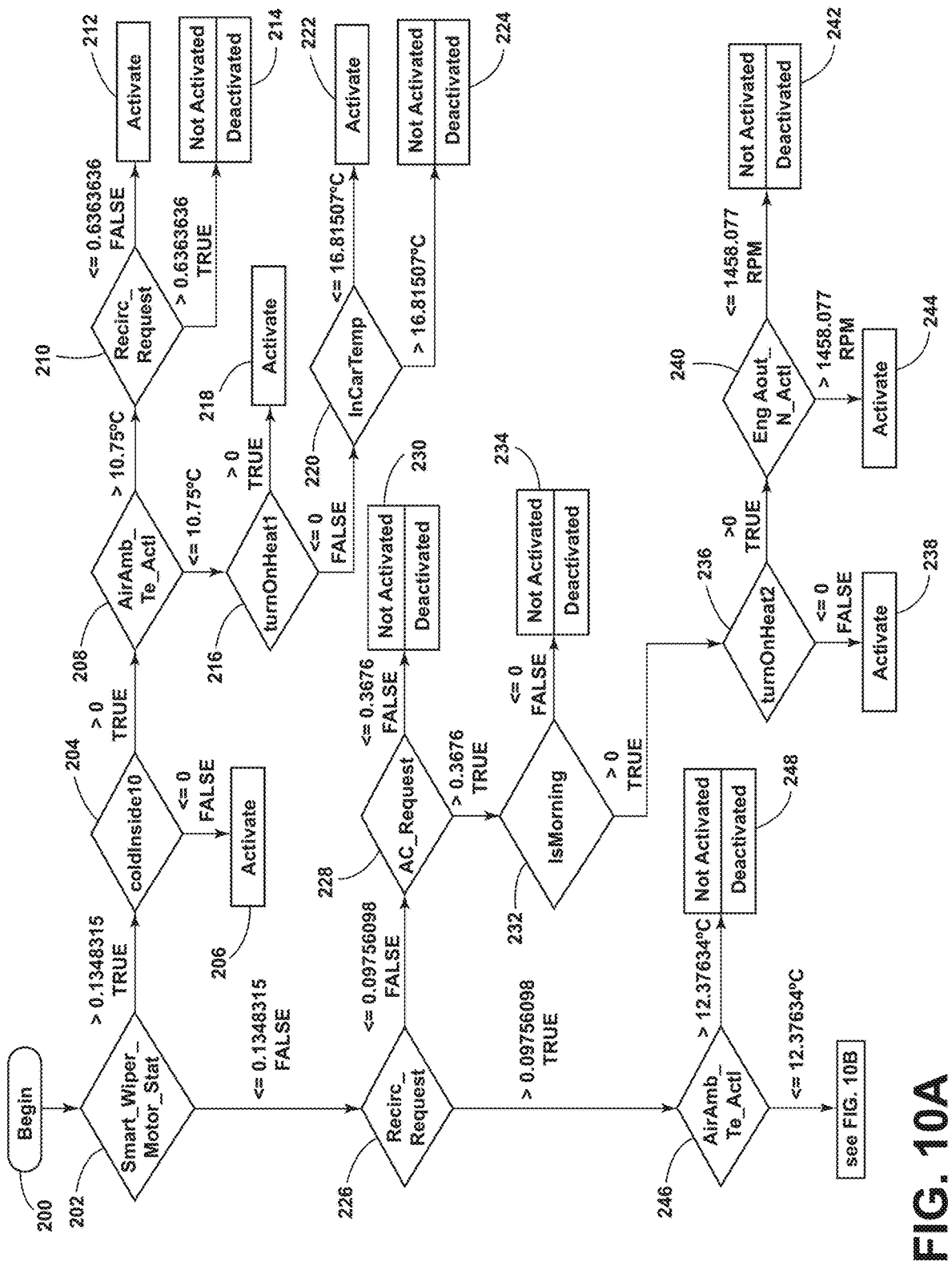
FIGS. 10A-10B are flow diagrams of the rules of a second example pre-established predictive activation model illustrating under what certain identifiable conditions, as supplied as input data from the data sources, the controller would activate or not activate/deactivate the heating element.
Figure 10B:
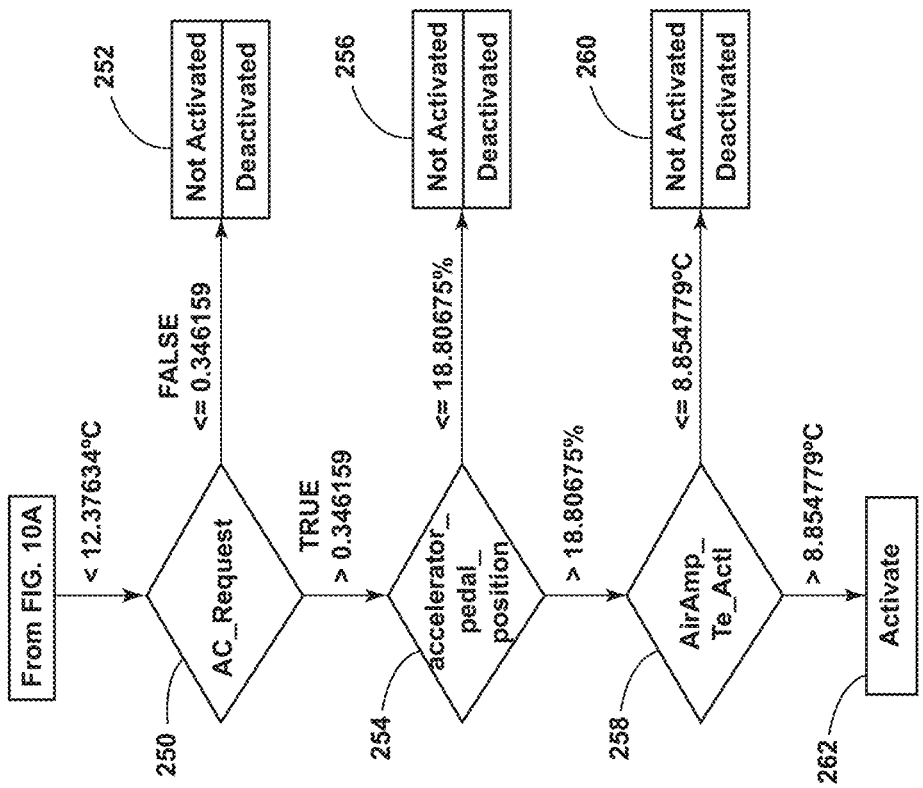

Referring now to FIGS. 10A-10B, at step 200, the controller 22 begins the process of comparing the collected data from the data sources 28 (concerning the Certain Identifiable Conditions) to the Pre-established Predictive Activation Model (step 50 in the overall process illustrated in FIG. 7). From step 200, the controller 22 proceeds to step 202, where the controller 22 determines whether there is sufficient moisture on the front windshield 30 so as to cause activation of automatically activated wipers to wipe the front windshield 30 ("Smart_Wiper_Motor_Stat"). If at step 202, the controller 22 determines that there is sufficient moisture on the front windshield 30 so as to cause activation of automatically activated wipers to wipe the front windshield 30 ("Smart_Wiper_Motor_Stat>0.1348315" i.e., TRUE), then the controller 22 proceeds to step 204. At step 204, the controller 22 considers whether the defined condition "coldInside10" is satisfied. If at step 204 the controller 22 considers the condition not to be satisfied ("coldInside10<=0" i.e., FALSE), then the controller 22 proceeds to step 206 and activates the heating element 18. As mentioned above, the defined Certain Identifiable Condition "coldInside10" is TRUE (is provided a value of 1, i.e., ">0,") when the temperature of the external environment 16 ("AirAmb_Te_Actl") is less than 60 degrees Fahrenheit and the difference in temperature between the temperature within the interior 12 of the vehicle 10 and the temperature of the external environment 16 ("tempDiff" explained above) is less than 10 degrees Fahrenheit. Accordingly, when either (a) the temperature of the external environment 16 ("AirAmb_Te_Actl") is greater than 60° Fahrenheit or (b) the difference in temperature between the temperature within the interior 12 of the vehicle 10 and the temperature of the external environment 16 ("tempDiff" explained above) is greater than 10° Fahrenheit, then the Certain Identifiable Condition is FALSE. As such, this third example illustrates a situation wherein, when there is sufficient moisture on a front windshield 30 of the vehicle 10 so as to cause activation of automatically activated wipers to wipe the front windshield 30, the controller 22 activates the heating element 18 pursuant to the rules of the Pre-established Predictive Activation Model if: (i) the temperature of an external environment 16 is greater than 60° Fahrenheit; or (ii) the difference in temperature between the temperature within an interior 12 of the vehicle 10 and the temperature of the external environment 16 is greater than 10° Fahrenheit. However, if at step 204 the controller 22 considers the condition to be satisfied ("coldInside10>0"), then the controller 22 proceeds to step 208. At step 208, the controller 22 determines whether the temperature of the external environment 16 ("AirAmb_Te_Actl") is less than/equal to or greater than a certain temperature (10.75° C.). If at step 208, the controller 22 determines that the temperature of the external environment 16 is greater than the certain temperature ("AirAmb_Te_Actl>10.75"), then the controller 22 proceeds to step 210. At step 210 the controller 22 determines whether the operator occupant has selected an air recirculation setting ("Recirc_Request"). If at step 210 the controller 22 determines that the air recirculation function has not been activated ("Recirc_Request<=0.6363636" that is, FALSE), then the controller 22 proceeds to step 212 and activates the heating element 18. However, if at step 210 the controller 22 determines that the air recirculation function has been activated ("Recirc_Request>0.6363636" that is, TRUE), then the controller 22 proceeds to step 214 and does not activate the heating element 18 or deactivates the heating element 18 if previously already automatically activated by the controller 22.

Returning to step 208, if the controller 22 determines that the temperature of the external environment 16 is less than/equal to the certain temperature ("AirAmb_Te_Actl<=10.75"), then the controller 22 proceeds to step 216. At step 216, the controller 22 determines whether the blower of the vehicle 10 is blowing heated air into the interior 12 with low speed ("turnOnHeat1"). If at step 216 the controller 22 determines that the blower of the vehicle 10 is blowing heated air into the interior 12 with low speed ("turnOnHeat1>0" i.e., TRUE), then the controller 22 proceeds to step 218 and activates the heating element 18. However, if at step 216 the controller 22 determines that the blower of the vehicle 10 is not blowing heated air into the interior 12 with low speed ("turnOnHeat1>0" i.e., TRUE), then the controller 22 proceeds to step 220. At step 220, the controller 22 determines whether the temperature within the interior 12 of the vehicle 10 ("InCarTemp") is less than/equal to or greater than a certain temperature (16.81507° C.). If at step 220, the controller 22 determines that the temperature within the interior 12 of the vehicle 10 is less than/equal to the certain temperature ("InCarTemp<=16.81507"), then the controller 22 proceeds to step 222 and activates the heating element 18. However, if at step 220, the controller 22 determines that the temperature within the interior 12 of the vehicle 10 is greater than the certain temperature ("InCarTemp>16.81507"), then the controller 22 proceeds to step 224 and does not activate the heating element 18 or deactivates the heating element 18 if previously already automatically activated by the controller 22.

Returning now to step 202, if the controller 22 determines that there is not sufficient moisture on the front windshield 30 so as to cause activation of automatically activated wipers to wipe the front windshield 30 ("Smart_Wiper_Motor_Stat<=0.1348315" i.e., FALSE), then the controller 22 proceeds to step 226. At step 226, the controller 22 determines whether the air recirculation setting has been activated ("Recirc_Request"). If at step 226 the controller 22 determines that the air recirculation setting has not been activated ("Recirc_Request<=0.09756098" i.e., FALSE"), then the controller 22 proceeds to step 228. At step 228 the controller 22 determines whether the operator occupant has activated an air conditioning function ("AC_Request"). If at step 228 the controller 22 determines that the air conditioning function has not been activated ("AC_Request<=0.3676471" that is, FALSE), then the controller 22 proceeds to step 230 and does not activate the heating element 18 or deactivates the heating element 18 if previously already automatically activated by the controller 22. However, if at step 230 the controller 22 determines that the air conditioning function has been activated ("AC_Request>0.3676471" that is, TRUE), then the controller 22 proceeds to step 232. At step 232, the controller 22 determines whether the time of day is a morning time ("isMorning"). If at step 232 the controller 22 determines that the time of day is not a morning time ("isMorning<=0" that is, FALSE"), then the controller 22 proceeds to step 234 and does not activate the heating element 18 or deactivates the heating element 18 if previously already automatically activated by the controller 22. However, if at step 232 the controller 22 determines that the time of day is a morning time ("isMorning>0"), then the controller 22 proceeds to step 236. At step 236, the controller 22 determines whether the blower of the vehicle 10 is blowing heated air into the interior 12 with medium blower speed ("turnOnHeat2"). If at step 236 the controller 22 determines that the blower of the vehicle 10 is not blowing heated air into the interior 12 with medium blower speed ("turnOnHeat2<=0" that is, FALSE), then the controller 22 proceeds to step 238 and activates the heating element 18. However, if at step 236 the controller 22 determines that the blower of the vehicle 10 is blowing heated air into the interior 12 with medium blower speed ("turnOnHeat2>0" that is, TRUE), then the controller 22 proceeds to step 240. At step 240, the controller 22 determines whether the engine speed of the vehicle 10 ("EngAout_N_Actl") is less than/equal to or greater than a certain value (1458.077 RPM). If at step 240 the controller 22 determines that the engine speed of the vehicle 10 is less than/equal to the certain value ("EngAout_N_Actl<=1458.077"), then the controller 22 proceeds to step 242 and does not activate the heating element 18 or deactivates the heating element 18 if previously already automatically activated by the controller 22. However, if at step 240 the controller 22 determines that the engine speed of the vehicle 10 is greater than the certain value ("EngAout_N_Actl>1458.077"), then the controller 22 proceeds to step 244 and activates the heating element 18.

This sequence of the third example Pre-established Predictive Activation Model illustrates a scenario wherein, the controller 22 activates the heating element 18 if the speed of the engine of the vehicle 10 is above a certain value (in this instance 1458.077 RPM) and other of the Certain Identifiable Conditions are satisfied, but the controller 22 deactivates the heating element 18 if the speed of the engine falls below the certain value (again, in this instance 1458.077 RPM) although the other of the Certain Identifiable Conditions are still satisfied. Returning to step 226, if the controller 22 determines that the air recirculation setting has been activated ("Recirc_Request>0.09756098" i.e., TRUE"), then the controller 22 proceeds to step 246. At step 246, the controller 22 determines whether the temperature of the external environment 16 ("AirAmb_Te_Actl") is less than/equal to or greater than a certain temperature (12.37634° C.). If at step 246 the controller 22 determines that the temperature of the external environment 16 is greater than the certain temperature ("AirAmb_Te_Actl>12.37634"), then the controller 22 proceeds to step 248 and does not activate the heating element 18 or deactivates the heating element 18 if previously already automatically activated by the controller 22. However, if at step 246 the controller 22 determines that the temperature of the external environment 16 is less than/equal to the certain temperature ("AirAmb_Te_Actl<=12.37634"), then the controller 22 proceeds to step 250. At step 250 the controller 22 determines whether the operator occupant has activated an air conditioning function ("AC_Request"). If at step 250 the controller 22 determines that the air conditioning function has not been activated ("AC_Request<=0.3461539" that is, FALSE), then the controller 22 proceeds to step 252 and does not activate the heating element 18 or deactivates the heating element 18 if previously already automatically activated by the controller 22. However, if at step 250 the controller 22 determines that the air conditioning function has been activate ("AC_Request>0.3461539"), then the controller 22 proceeds to step 254. At step 254, the controller 22 determines whether the relative position of the accelerator pedal ("accelerator_pedal_position") is less than/equal to or greater than a certain value (18.80675 percent depressed). If at step 254 the controller 22 determines that the relative positon of the accelerator pedal is less than/equal to the certain value ("accelerator_pedal_position<=18.80675"), then the controller 22 proceeds to step 256 and does not activate the heating element 18 or deactivates the heating element 18 if previously already automatically activated by the controller 22. However, if at step 254 the controller 22 determines that the relative positon of the accelerator pedal is greater than the certain value ("accelerator_pedal_position>18.80675"), then the controller 22 proceeds to step 258. At step 258, the controller 22 determines whether the temperature of the external environment 16 ("AirAmb_Te_Actl") is less than/equal to or greater than a certain temperature (8.854779° C.). If at step 258, the controller 22 determines that the temperature of the external environment 16 is less than/equal to the certain temperature ("AirAmb_Te_Actl<=8.854779"), then the controller 22 proceeds to step 260 and does not activate the heating element 18 or deactivates the heating element 18 if previously already automatically activated by the controller 22. However, if at step 258 the controller 22 determines that the temperature of the external environment 16 is greater than the certain temperature ("AirAmb_Te_Actl>8.854779"), then the controller 22 activates the heating element 18.

This sequence of the third example Pre-established Predictive Activation Model illustrates a situation where when there is insufficient moisture on a front windshield 30 of the vehicle 10 to cause activation of automatically activated wipers to wipe the front windshield 30, the controller 22 nevertheless activates the heating element 18 pursuant to the rules of the Pre-established Predictive Activation Model if: (i) an air recirculation setting is activated; (ii) the temperature of the external environment 16 is less than a first certain temperature (in this instance 12.37634° C.); (iii) an air conditioning setting is activated, (iv) the accelerator pedal is depressed at least a certain percentage; and (v) the temperature of the external environment 16 is greater than a second certain temperature (in this instance 8.854779° C.) that is less than the first certain temperature.

The method can further comprise automatically deactivating the heating element 18 pursuant to the Pre-established Predictive Activation Model, after initially automatically activating the heating element 18 pursuant to the Pre-established Predictive Activation Model, if the collected data relating to the Certain Identifiable Conditions collected after initially automatically activating the heating element 18 satisfy the rules of the Pre-established Predictive Activation Model for deactivation of the heating element 18. For example, using the first example Pre-established Predictive Activation Model formed pursuant to the C.50 program set forth above, the controller 22 would initially automatically activate the heating element 18: (i) if it is morning time ("isMorning >0"); (ii) there is sufficient moisture on the front windshield 30 so as to cause activation of automatically activated wipers to wipe the front windshield 30 ("Smart_Wiper_Motor_Stat>0.032" i.e., TRUE); (iii) the temperature of the external environment 16 is less than/equal to 6.398602° C. ("AirAmb_Te_Actl<=6.398602"); and (iv) the temperature difference between the temperature within the interior 12 of the vehicle 10 and the temperature of the external environment 16 is less than/equal to 13.07087° C. ("tempDiff<=13.07087"). However, if the controller 22 receives input that all the other conditions are still satisfied, but the temperature difference between the temperature within the interior 12 of the vehicle 10 and the temperature of the external environment 16 is now greater than 13.07087° C. ("tempDiff>13.07087"), then the controller 22 deactivates the heating element 18.

The method of controlling the heating element 18 can further comprise automatically reactivating the heating element 18 pursuant to the Pre-established Predictive Activation Model(s), after automatically deactivating the heating element 18 pursuant to the Pre-established Predictive Activation Model, if the collected data relating to the Certain Identifiable Conditions collected after deactivating the heating element 18 again satisfy the rules for activation pursuant to the Pre-established Predictive Activation Model(s). The controller 22 can continue to collect data relative to the Certain Identifiable Conditions while the triggering event (see step 46 above) remains valid (i.e., the vehicle 10 is still moving) and compare the collected data to the rules of the Pre-established Predictive Activation Model. If the collected data once again satisfies the rules of the Pre-established Predictive Activation Model to activate the heating element 18, then the controller 22 can reactivate the heating element 18 accordingly. For example, again using the example Pre-established Predictive Activation Model set forth above, if the controller 22 subsequently again receives input data relating to the Certain Identifiable Conditions that satisfy the rules of the Pre-established Predictive Activation Model for activation of the heating element 18, such as temperature difference between the temperature within the interior 12 of the vehicle 10 and the temperature of the external environment 16 is again less than/equal to 13.07087° C. ("tempDiff<=13.07087"), then the controller 22 reactivates the heating element 18. In other words, the controller 22 accepts input data relating to the Certain Identifiable Conditions in "real-time" and dynamically considers whether the input data satisfies any of the rules of the Pre-established Predictive Activation Model for activation or deactivation of the heating element 18, and controls the activation/deactivation of the heating element 18 accordingly.

The method of controlling the heating element 18 can further comprise an occupant of the vehicle 10, such as an occupant of the seating assembly 34, manually deactivating the heating element 18 via the user interface 32 (see FIG. 6A). For example, the occupant of the seating assembly 34 could press the graphical button 40 labeled "OFF" on the touch screen display 36 to manually deactivate the heating element 18 that the controller 22 had previously activated automatically pursuant to the Pre-established Predictive Activation Model. The controller 22 accepts this interface as input and consequently deactivates the heating element 18.

The method of controlling the heating element 18 can further comprise, upon the occupant of the vehicle 10 manually deactivating the heating element 18 via the user interface 32, recalibrating the Pre-established Predictive Activation Model into a New Predictive Activation Model accounting for the collected data relating to the Certain Identifiable Conditions existing when the occupant manually deactivated the heating element 18, and thus, establishing new rules for activation and deactivation of the heating element 18. To do so, the controller 22 can be pre-loaded with software to perform classification and regression tree analyses, such as the mentioned C.50 program. The occupant's manual deactivation of the heating element 18 that had been automatically activated by the controller 22 pursuant to the Pre-established Predictive Activation Model constitutes the occupant's rejection of the rule of the Pre-established Predictive Activation Model (and therefore the Certain Identifiable Conditions satisfying the rule) the controller 22 relied upon to automatically activate the heating element 18. For example, using this rule of the Pre-established Predictive Activation Model set forth above—

```
isMorning > 0:
:...Smart_Wiper_Motor_Stat > 0.032:
    :....AirAmb_Te_Actl > 6.398602: 0 (6)
    : AirAmb_Te_Actl <= 6.398602:
    : :...tempDiff <= 13.07087: 1 (11/1)
        tempDiff > 13.07087: 0(2)
```

—would initially automatically activate the heating element 18: (i) if it is morning time ("isMorning>0"); (ii) there is sufficient moisture on the front windshield 30 so as to cause activation of automatically activated wipers to wipe the front windshield 30 ("Smart_Wiper_Motor_Stat>0.032" i.e., TRUE); (iii) the temperature of the external environment 16 is less than/equal to 6.398602° C. ("AirAmb_Te_Actl<=6.398602"); and (iv) the temperature between the temperature within the interior 12 of the vehicle 10 the temperature of the external environment 16 is less than/equal to 13.07087° C. ("tempDiff<=13.07087"). However, if the controller 22 automatically activates the heating element 18 and the occupant rejects the activation by manually deactivating the heating element 18 via the user interface 32, then the controller 22 recalibrates the Pre-established Predictive Activation Model into a New Predictive Activation Model, accounting for the data related to the Certain Identifiable Conditions existing when the occupant manually deactivated the heating element 18. The New Predictive Activation Model can weigh the occupant's decision heavily such that when the Certain Identifiable Conditions that existed when the occupant manually deactivated the heating element 18 exist again, the controller 22 would not activate the heating element 18 and would deactivate automatically the heating element 18 if the heating element 18 was activated. In other words, the New Predictive Activation Model can include a rule, as a function of those Certain Identifiable Conditions, for deactivating or not activating the heating element 18. Alternatively, the New Predictive Activation Model can weigh the data related to the Certain Identifiable Conditions existing when the occupant manually deactivated the heating element 18 the same as the data collected from the Test Vehicles, from which the Pre-established Predictive Activation Model was originally derived. In any case, the New Predictive Activation Model will continue to utilize the data collected from the Test Vehicles as well as the data collected from the vehicle 10 relating to the Certain Identifiable Conditions existing when the occupant manually deactivated the heating element 18.

The method of controlling the heating element 18 can further comprise the occupant manually activating the heating element 18 via the user interface 32. For example, the occupant of the vehicle 10 could press the graphical button 40 labeled "ON" on the touch screen display 36 (see FIG. 6B) to activate the heating element 18. The controller 22 accepts this interface as input and consequently activates the heating element 18 that the controller 22 either previously deactivated or did not activate pursuant to the Pre-established Predictive Activation Model (or New Predictive Activation Model).

The method of controlling the heating element 18 can further comprise recalibrating the New Predictive Activation Model into a Newer Predictive Activation Model accounting for the collected data relative to the Certain Identifiable Conditions existing when the occupant manually activated the heating element 18 and establishing new rules for activation and/or deactivation of the heating element 18, upon the occupant manually activating the heating element 18 via the user interface 32. The controller 22 records the data relative to the Certain Identifiable Conditions existing when the occupant manually activates the heating element 18 and prepares a Newer Predictive Activation Model with new rules for activation using the data. Again, the Newer Predictive Activation Model can weigh heavily the data relating to the Certain Identifiable Conditions existing when the occupant manually activated the heating element 18 with a new rule such that the controller 22 automatically activates the heating element 18 when those Certain Identifiable Conditions again exist. Alternatively, the Newer Predictive Activation Model can weigh the data relative to the Certain Identifiable Conditions existing when the occupant manually activated the heating element 18 the same as the other data previously relied upon to derive the Pre-established Predictive Activation Model. In general, the controller 22 continues to refine the predictive modeling (the Pre-established Predictive Activation Model and subsequent recalibrations thereof) by performing a new CART analysis based on the data relative to the Certain Identifiable Conditions whenever the occupant of the vehicle 10 manually activates or deactivates the heating element 18. Eventually, the predictive modeling will be refined according to the operator occupant's preferences and the operator occupant will no longer have the need to manually activate or deactivate the heating element 18—the predictive modeling will activate or deactivate the heating element 18 automatically to satisfy the operator occupant's preferences.

Refining the Pre-established Predictive Activation Model into the New Predictive Activation Model, the Newer Predictive Activation Model, and subsequent refinements thereof will identify the preferences of the operator occupant. For example, the operator occupant may desire the heating element 18 to impart heat to the rear windshield 14 immediately upon starting the engine of the vehicle 10, while parked in a garage, during weekdays of the winter season as a compensation effect to compensate for snow that the vehicle 10 will likely encounter after exiting the garage and entering the external environment 16. The heated rear windshield 14 will more readily melt the snow and thereby potentially maintain visibility through the rear windshield 14. A CART analysis of the collected data relating to the Certain Identifiable Conditions will learn this behavior and eventually automatically activate and deactivate the heating element 18 accordingly. The CART analysis is thus a learning algorithm that provides a high degree of accuracy because the Certain Identifiable Conditions are considered across the entire history of the vehicle 10. Other possible non-learning methods, such as those involving weighted averages, will not be as accurate and will not account for time/day/season dependent behavior.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the afore-mentioned structure without departure from the concepts of the present disclosure, and further it is to be understood that such concepts are intended to be covered by the following claims unless these claims by their language expressly state otherwise.

What is claimed is:

1. A method of controlling a heating element in thermal communication with a rear window of a vehicle comprising:
   with a vehicle in an external environment, the vehicle comprising:
   a rear window and a heating element in thermal communication with the rear window;
   a controller in communication with the heating element, the controller including a Pre-established Predictive Activation Model stored in memory setting forth rules governing activation of the heating element as a function of data relating to Certain Identifiable Conditions; and
   a user interface configured to allow the heating element to be manually activated or deactivated;

collecting data relating to the Certain Identifiable Conditions;

determining, by comparing the collected data to the rules of the Pre-established Predictive Activation Model, whether the collected data satisfies the rules of the Pre-established Predictive Activation Model so as to initially automatically activate the heating element; and automatically activating the heating element;

wherein, the Pre-established Predictive Activation Model was formed pursuant to an analysis of input data related to the Certain Identifiable Conditions collected from other vehicles that existed when users of the other vehicles manually activated or deactivated a heating element to heat a rear windshield of those other vehicles;

wherein, the Pre-established Predictive Activation Model establishes rules that are a function of at least the following Certain Identifiable Condition: whether a speed of an engine of the vehicle is above a certain value.

2. The method of claim 1, wherein, the Pre-established Predictive Activation Model establishes rules that are a function of at least the further following Certain Identifiable Conditions: a time of day; and a temperature within an interior of the vehicle.

3. The method of claim 1, wherein, when a time of the day is a morning time, the controller activates the heating element pursuant to the rules of the Pre-established Predictive Activation Model as a function of data related to at least one other of the Certain Identifiable Conditions excluding the time of the day.

4. The method of claim 1, wherein, whether the collected data satisfies the rules of the Pre-established Predictive Activation Model so as to initially automatically activate the heating element is further a function of: a temperature within an interior of the vehicle being below a certain temperature, an air conditioning function having been activated, it being not a morning time, and an accelerator pedal being depressed greater than a certain percentage.

5. The method of claim 1, wherein, whether the collected data satisfies the rules of the Pre-established Predictive Activation Model so as to initially automatically activate the heating element is further a function of: a time of day being a morning time, a temperature of the external environment; whether there is sufficient moisture on a front windshield of the vehicle so as to cause activation of automatically activated wipers to wipe the front windshield; and a difference in temperature between a temperature within an interior of the vehicle and the temperature of the external environment.

6. The method of claim 1, wherein, whether the collected data satisfies the rules of the Pre-established Predicative Activation Model so as to initially automatically activate the heating element is further a function of: (i) whether there is sufficient moisture on a front windshield of the vehicle so as to cause activation of automatically activated wipers to wipe the front windshield, and (ii) a temperature of the external environment being greater than 15.556° C. or a difference in temperature between a temperature within an interior of the vehicle and the temperature of the external environment being greater than 5.6° C.

7. The method of claim 1, wherein, whether the collected data satisfies the rules of the Pre-established Predicative Activation Model so as to initially automatically activate the heating element is further a function of: (i) whether there is insufficient moisture on a front windshield of the vehicle to cause activation of automatically activated wipers to wipe the front windshield, (ii) an air recirculation setting being activated; (iii) a temperature of the external environment being less than a first certain temperature; (iv) an air conditioning setting being activated, (v) an accelerator pedal being depressed at least a certain percentage; and (vi) the temperature of the external environment being greater than a second certain temperature that is less than the first certain temperature.

8. The method of claim 1, wherein, whether the collected data satisfies the rules of the Pre-established Predicative Activation Model so as to initially automatically activate the heating element is further a function of: a temperature in an interior of the vehicle being below a certain temperature.

9. The method of claim 1, wherein, whether the collected data satisfies the rules of the Pre-established Predicative Activation Model so as to initially automatically activate the heating element is further a function of a time of day being within a certain period of time.

10. The method of claim 1, wherein, whether the collected data satisfies the rules of the Pre-established Predicative Activation Model so as to initially automatically activate the heating element is further a function of: (i) a blower of the vehicle blowing heated air into an interior of the vehicle with a high blower speed; and (ii) a difference in temperature between a temperature within the interior of the vehicle and a temperature of the external environment being within a certain range.

11. The method of claim 1 further comprising:

the data relating to the Certain Identifiable Conditions collected after initially automatically activating the heating element satisfies the rules of the Pre-established Predictive Activation Model for deactivation of the heating element; and automatically deactivating the heating element pursuant to the Pre-established Predictive Activation Model, after initially automatically activating the heating element pursuant to the Pre-established Predictive Activation Model.

12. The method of claim 11 further comprising:

the data relating to the Certain Identifiable Conditions collected after deactivating the heating element again satisfies the rules for activation pursuant to the Pre-established Predictive Activation Model; and automatically reactivating the heating element pursuant to the Pre-established Predictive Activation Model, after automatically deactivating the heating element pursuant to the Pre-established Predictive Activation Model.

13. The method of claim 12 further comprising:

an occupant of the vehicle manually deactivating the heating element via the user interface.

14. The method of claim 13 further comprising:

upon the occupant manually deactivating the heating element via the user interface, recalibrating the Pre-established Predictive Activation Model into a new predictive activation model accounting for the collected data relating to the Certain Identifiable Conditions existing when the occupant manually deactivated the heating element and establishing new rules for activation and/or deactivation of the heating element.

15. The method of claim 14 further comprising:
the occupant manually activating the heating element via the user interface.

16. The method of claim 15 further comprising:
upon the occupant manually activating the heating element via the user interface, recalibrating the new predictive activation model into a newer predictive activation model accounting for the collected data relative to the Certain Identifiable Conditions existing when the occupant manually activated the heating element and establishing new rules for activation and/or deactivation of the heating element.

17. A method of controlling a heating element in thermal communication with a rear window of a vehicle comprising:
with a vehicle in an external environment, the vehicle comprising:
a rear window and a heating element in thermal communication with the rear window;
a controller in communication with the heating element, the controller including a Pre-established Predictive Activation Model setting forth rules governing activation of the heating element as a function of data relating to Certain Identifiable Conditions; and
a user interface configured to allow the heating element to be manually activated or deactivated;
collecting data relating to the Certain Identifiable Conditions;
determining, by comparing the collected data to the rules of the Pre-established Predictive Activation Model, whether the collected data satisfies the rules of the Pre-established Predictive Activation Model so as to initially automatically activate the heating element; and
automatically activating the heating element;
wherein, the Pre-established Predictive Activation Model establishes rules that are a function of at least the following Certain Identifiable Condition: whether there is sufficient moisture on a front windshield of the vehicle so as to cause activation of automatically activated wipers to wipe the front windshield.

18. The method of claim 17,
wherein, the Pre-established Predictive Activation Model was formed pursuant to an analysis of input data related to the Certain Identifiable Conditions collected from other vehicles that existed when users of the other vehicles manually activated or deactivated a heating element to heat a rear windshield of those other vehicles.

19. A method of controlling a heating element in thermal communication with a rear window of a vehicle comprising:
with a vehicle in an external environment, the vehicle comprising:
a rear window and a heating element in thermal communication with the rear window;
a controller in communication with the heating element, the controller including a Pre-established Predictive Activation Model setting forth rules governing activation of the heating element as a function of data relating to Certain Identifiable Conditions; and
a user interface configured to allow the heating element to be manually activated or deactivated;
collecting data relating to the Certain Identifiable Conditions;
determining, by comparing the collected data to the rules of the Pre-established Predictive Activation Model, whether the collected data satisfies the rules of the Pre-established Predictive Activation Model so as to initially automatically activate the heating element; and
automatically activating the heating element;
wherein, the Pre-established Predictive Activation Model establishes rules that are further a function of at least the following Certain Identifiable Conditions: a temperature of the external environment; and positioning of an accelerator pedal of the vehicle relative to fully depressed or not depressed.

20. The method of claim 19,
wherein, the Pre-established Predictive Activation Model was formed pursuant to an analysis of input data related to the Certain Identifiable Conditions collected from other vehicles that existed when users of the other vehicles manually activated or deactivated a heating element to heat a rear windshield of those other vehicles.

* * * * *